United States Patent
Song et al.

(10) Patent No.: US 11,818,400 B2
(45) Date of Patent: Nov. 14, 2023

(54) ADJUSTABLE TRADE-OFF BETWEEN QUALITY AND COMPUTATION COMPLEXITY IN VIDEO CODECS

(71) Applicant: DOLBY LABORATORIES LICENSING CORPORATION, San Francisco, CA (US)

(72) Inventors: Qing Song, Sunnyvale, CA (US); Arun Raj, Santa Clara, CA (US); Guan-Ming Su, Fremont, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 17/768,307

(22) PCT Filed: Oct. 16, 2020

(86) PCT No.: PCT/US2020/055864
§ 371 (c)(1),
(2) Date: Apr. 12, 2022

(87) PCT Pub. No.: WO2021/076822
PCT Pub. Date: Apr. 22, 2021

(65) Prior Publication Data
US 2023/0171436 A1 Jun. 1, 2023

Related U.S. Application Data

(60) Provisional application No. 62/916,579, filed on Oct. 17, 2019.

(30) Foreign Application Priority Data
Oct. 17, 2019 (EP) .................................... 19203773

(51) Int. Cl.
*H04N 19/00* (2014.01)
*H04N 19/86* (2014.01)
(Continued)

(52) U.S. Cl.
CPC ........... *H04N 19/86* (2014.11); *H04N 19/132* (2014.11); *H04N 19/186* (2014.11); *H04N 19/46* (2014.11)

(58) Field of Classification Search
CPC .... H04N 19/86; H04N 19/132; H04N 19/186; H04N 19/46
See application file for complete search history.

(56) References Cited

U.S. PATENT DOCUMENTS 10,032,262 B2   7/2018   Kheradmand
2017/0221189 A1  8/2017   Kheradmand
(Continued)

FOREIGN PATENT DOCUMENTS

WO     2020072651 A1   4/2020

OTHER PUBLICATIONS

Hsin Chengho et al: 11Color preservation for tone reproduction and image enhancement Proceedings of SPIE/ IS & T, vol. 9015, Jan. 8, 2014 (Jan. 8, 2014), pp. 90150B-90150B.
(Continued)

*Primary Examiner* — Zhihan Zhou

(57) ABSTRACT

A backward reshaping mapping table is initially generated as an inverse of a forward reshaping mapping table. The backward reshaping mapping table is updated by replacing the content-mapped luminance codewords with forward reshaped luminance codewords generated by applying a luminance forward mapping to the sampled luminance codewords. The luminance forward mapping is constructed from the forward reshaping mapping table. The backward reshaping mapping table and the luminance forward mapping are used to generate backward reshaping mappings for creating a reconstructed image from a forward reshaped image. The forward reshaped image is encoded, in a video signal, along with image metadata specifying the backward reshaping
(Continued)

mappings. A recipient device of the video signal applies the backward reshaping mappings to the forward reshaped image to create the reconstructed image of the second dynamic range.

14 Claims, 8 Drawing Sheets

(51) Int. Cl.
  *H04N 19/132* (2014.01)
  *H04N 19/186* (2014.01)
  *H04N 19/46* (2014.01)

(56) References Cited

U.S. PATENT DOCUMENTS

| | | | |
|---|---|---|---|
| 2018/0007356 A1* | 1/2018 | Kadu | .................. H04N 19/117 |
| 2018/0020224 A1 | 1/2018 | Su | |
| 2018/0098094 A1 | 4/2018 | Wen | |
| 2019/0110054 A1* | 4/2019 | Su | ........................ H04N 19/117 |
| 2019/0272643 A1* | 9/2019 | Gadgil | ...................... G06T 5/50 |
| 2019/0349607 A1 | 11/2019 | Kadu | |
| 2021/0195221 A1 | 6/2021 | Song | |
| 2021/0368212 A1 | 11/2021 | Song | |

OTHER PUBLICATIONS

ITU Rec.BT 1886 "Reference Electro-Optical Transfer Function for Flat Panel Displays used in HDTV Studio Production" Mar. 2011.
ITU-R BT. 2100 "Image Parameter Values for High Dynamic Range Television for Use in Production and International Programme Exchange" ITU, Jul. 2016.
SMPTE ST 2084:2014 "High Dynamic Range EOTF of Mastering Reference Displays", SMPTE 2014.
Pu, Fangjun et al. CE12-4: SDR In-loop Reshaping Joint Video Experts Team (JVET) of ITU-T SG 16 WP 3 and ISO/IEC JTC 1/SC 29/WG 11 12th Meeting: Macao, CN, Oct. 3-12, 2018, [JVET-L0246-v2] JVET-L0246 (version 2) ITU-T, Oct. 4, 2018.

* cited by examiner

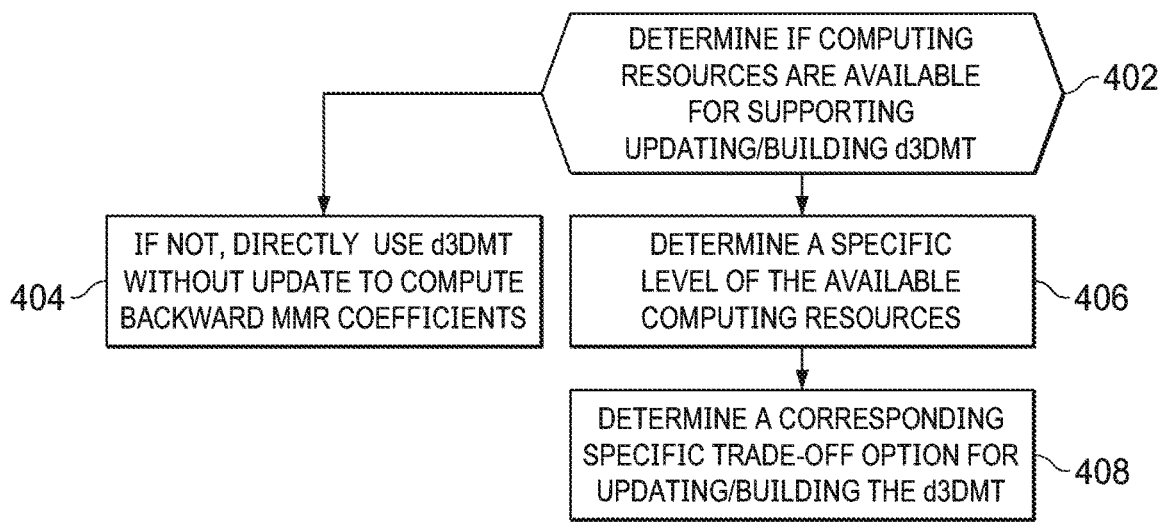
FIG. 4A
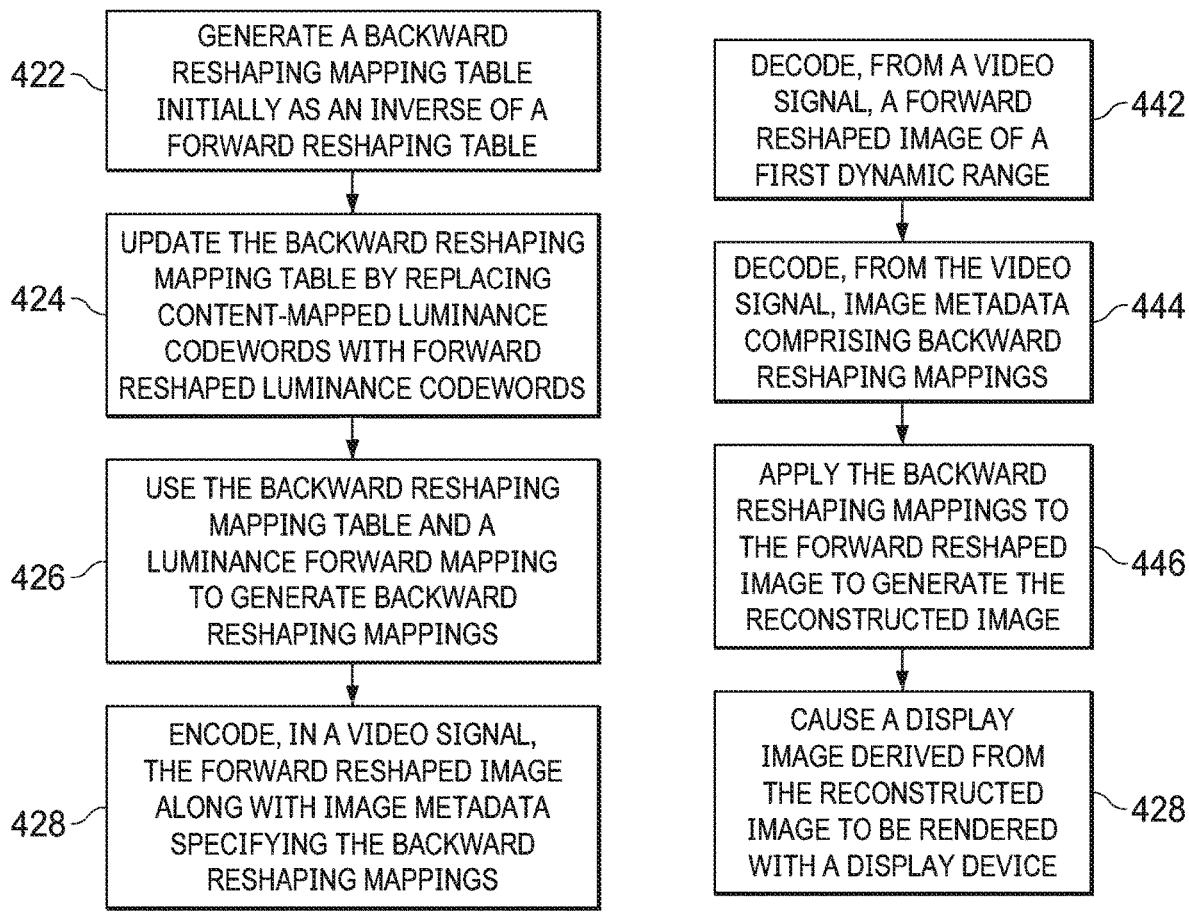
FIG. 4B
FIG. 4C

ADJUSTABLE TRADE-OFF BETWEEN QUALITY AND COMPUTATION COMPLEXITY IN VIDEO CODECS

CROSS REFERENCE TO RELATED APPLICATIONS

This application claims priority to U.S. Provisional Patent Application No. 62/916,579, filed Oct. 17, 2019 and European Patent Application No. 19203773.7, filed Oct. 17, 2019, each of which is hereby incorporated by reference in its entirety.

TECHNOLOGY

The present disclosure relates generally to images. More particularly, an embodiment of the present disclosure relates to adjustable trade-off between quality and computation complexity in video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, *"Image parameter values for high dynamic range television for use in production and international programme exchange,"* (June 2017). As appreciated by the inventors here, improved techniques for composing video content data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 4A through FIG. 4C illustrate example process flows; and

DESCRIPTION OF EXAMPLE EMBODIMENTS

Figure 1A:
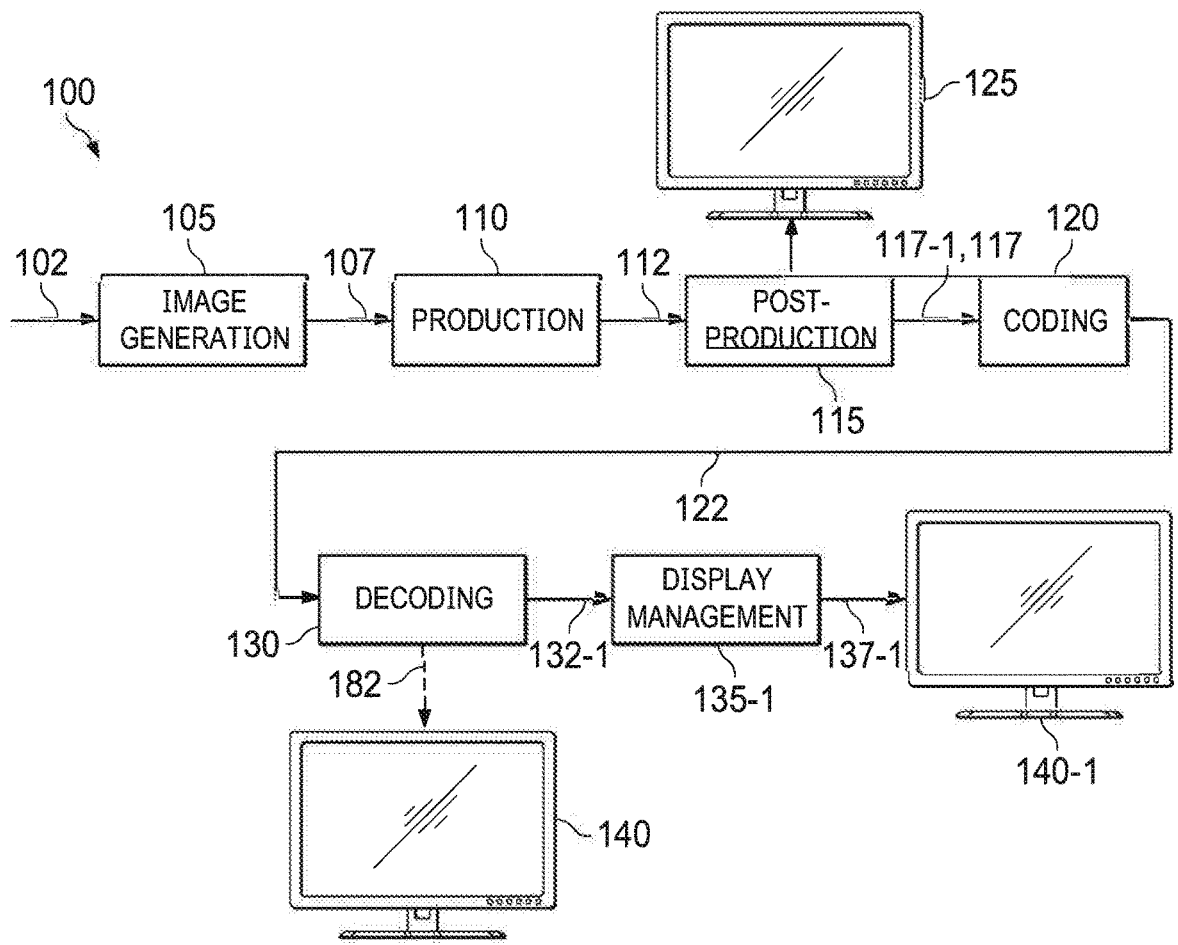
FIG. 1A depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Base layer (BL) image data (e.g., of a relatively low bit depth, 8 bits, 10 bits, etc.) of a relatively narrow dynamic range may be encoded in a coded bitstream along with image metadata used for generating/reconstructing HDR image data from the BL image data. The BL image data and the image metadata can be provided to recipient decoding and playback devices, which may directly render the BL image data (e.g., SDR image data, etc.) after decoding on relatively low dynamic range displays (e.g., SDR displays, etc.) or which may reconstruct HDR image data from the decoded BL image data and image metadata and render the HDR image data on relatively high dynamic range displays (e.g., HDR displays, etc.).

In an example (e.g., high-fidelity, etc.) approach, quality of reconstructed HDR image data may be maximized at the cost of significantly increasing computational costs and video delivery delays. In another example (e.g., high-efficiency, etc.) approach, computational costs to generate image metadata used for reconstructing HDR image data may be minimized at the cost of significantly reducing quality of the reconstructed HDR image data. A relatively large gap exists between the high fidelity and high-efficiency approaches in terms of decoder-side quality of rendering reconstructed HDR images and encoder-side computational costs (or efficiency). Example high-fidelity and high efficiency image metadata generation are described in PCT Patent Application No. PCT/US2019/031620, filed on May 9, 2019, the entire contents of which are hereby incorporated by reference as if fully set forth herein.

To better exploit capabilities of various codecs and media processing systems and to better provide flexibility in timely supporting various media consumption applications with maximally feasible quality, coding tools implementing tradeoffs between quality and computational complexity are provided under techniques as described herein to fill the relatively large gap between the previously mentioned high-fidelity and high-efficiency approaches. For example, these coding tools can be used to provide trade-offs between decoder-side quality of reconstructed HDR image data achievable and encoder-side computational costs of generating image metadata to be used for generating the reconstructed HDR image.

Content providers and/or content consumers may select some or all of the coding tools based on resource budgets (e.g., computational cost budgets, end-to-end or individual system latency budgets, end-to-end or individual delay budgets, etc.) and visual quality targets or objectives for reconstructed HDR image data.

Some or all of these coding tools may implement techniques to achieve color accuracy in both BL as well as reconstructed HDR image data. Additionally, optionally or alternatively, some or all of these coding tools may implement techniques to alleviate or reduce the risk of banding artifacts which may be prone to happening in some operational scenarios (e.g., in SDR image data, etc.). The techniques can be used to further improve banding reduction such as those described in U.S. Provisional Patent Application No. 62/885,921, filed on Aug. 13, 2019, also published as WO/2020/072651 for PCT/US2019/054299, the entire contents of which are hereby incorporated by reference as if fully set forth herein.

Forward mapping tables (e.g., comprising mapping pairs that map HDR codewords to corresponding SDR codewords, etc.) such as dynamic—e.g., image-dependent, image-specific, scene-dependent, scene-specific, etc.—three-dimensional mapping tables (d3DMTs) may be used to generate forward reshaping mappings (e.g., forward reshaping function/curve or polynomial set, forward lookup table or FLUT, forward reshaping multivariate multiple regression (MMR) coefficients, etc.) to forward reshape source HDR images into SDR images (or the BL image data).

Backward mapping tables (e.g., comprising mapping pairs that map SDR codewords to corresponding HDR codewords, etc.) such as backward d3DMTs may be used to generate backward reshaping mappings (e.g., backward reshaping function/curve or polynomial set, backward lookup table or BLUT, backward reshaping MMR coefficients, etc.) to backward reshape the SDR images into HDR images (or the reconstructed HDR image data) approximating the source HDR images.

The forward reshaped SDR images and image metadata specifying the backward reshaping mappings may be encoded into a coded bitstream to enable recipient decoding/playback devices to directly render the SDR images or to render (backward reshaped) HDR constructed from the SDR images and the backward reshaping mappings.

The backward d3DMTs may be constructed in a computationally efficient manner from the corresponding forward mapping tables (forward d3DMT). Additionally, optionally or alternatively, the backward d3DMTs may be directly built using the source HDR images and the forward reshaped SDR images (once the forward reshaped SDR images are available) to improve reshaping mapping accuracy.

Before being used to generate the backward reshaping mappings, the d3DMTs as described herein may be updated in one of: a proper subset of channels or planes in a set of all channels or planes of a color space. In some operational scenarios, the d3DMTs may be updated in only the luminance (or luma) channel/plane of the color space, thereby improving color accuracy in BL and/or reconstructed HDR image data to some extent. In some operational scenarios, the d3DMTs may be updated in (e.g., all, etc.) luminance and chrominance (or chroma) channels/planes, thereby improving color accuracy in BL and/or reconstructed HDR image data to a relatively significant extent.

Thus, reshaping mapping accuracy including but not limited to color accuracy and corresponding computational costs can be made adjustable by updating only luma channel/plane of the forward d3DMTs, or by updating both luma and chroma planes of the forward d3DMTs, or by building the backward d3DMTs directly from the source HDR images and the forward reshaped SDR images.

To alleviate banding artifacts, some or all of noise injection, BLUT modification, etc., may be performed. Example noise injection and/or BLUT modification are described in previously mentioned U.S. Provisional Patent Application No. 62/885,921.

It is observed that modifying/updating luminance backward reshaping mappings such as luminance BLUTs may affect color accuracy in the reconstructed HDR images to cause an unintended change of color appearance in the reconstructed HDR images.

Color rectification operations as described herein may be implemented or performed to rectify colors of pixels affected by BLUT modifications (e.g., used to alleviate banding artifacts, etc.), such that the colors in the reconstructed HDR images (e.g., after alleviating banding artifacts, etc.) look closer to those in the source HDR images than otherwise. Additionally, optionally or alternatively, noise injection operations are improved to make injected noise more visually enjoyable than otherwise.

Example embodiments described herein relate to generating and encoding backward reshaping mappings for image reconstruction. A backward reshaping mapping table is initially generated as an inverse of a forward reshaping mapping table. The forward reshaping table is used to generate forward reshaping mappings to generate a forward reshaped image of a first dynamic range from a source image of a second dynamic range. The first dynamic range is lower than the second dynamic range. The forward reshaping mapping table comprises sampled luminance codewords of the second dynamic range, sampled chrominance codewords of the second dynamic range, content-mapped luminance codewords of the first dynamic range corresponding to the sampled luminance codewords of the second dynamic range, and content-mapped chrominance codewords of the first dynamic range corresponding to the sampled chrominance codewords of the second dynamic range. The backward reshaping mapping table is updated by replacing the content-mapped luminance codewords with forward reshaped luminance codewords. The forward reshaped luminance codewords are generated by applying a luminance forward mapping to the sampled luminance codewords of the second dynamic range. The luminance forward mapping is constructed from the forward reshaping mapping table. The backward reshaping mapping table and the luminance forward mapping are used to generate backward reshaping mappings for creating a reconstructed image of the second dynamic range from the forward reshaped image of the first dynamic range. The forward reshaped image is encoded, in a video signal, along with image metadata specifying the backward reshaping mappings. A recipient device of the video signal applies the backward reshaping mappings to the forward reshaped image to create the reconstructed image of the second dynamic range.

Example embodiments described herein relate to decoding backward reshaping mappings for image reconstruction and rendering. A forward reshaped image of a first dynamic range is decoded from a video signal Image metadata comprising backward reshaping mappings is decoded from the video signal. The backward reshaping mappings were generated by an upstream image processing device from a backward reshaping mapping table and a luminance forward mapping. The backward reshaping mapping table was initially generated by the upstream image processing device as an inverse of a forward reshaping mapping table that generates the luminance forward mapping. Content-mapped luminance codewords in the backward reshaping mapping table was updated with forward reshaped luminance codewords. The forward reshaped luminance codewords were generated by applying the luminance forward mapping to sampled source luminance codewords in the source image. The backward reshaping mappings are applied to the forward reshaped image to generate the reconstructed image. A display image is caused to be derived from the reconstructed image to be rendered with a display device.

Example Video Delivery Processing Pipeline

FIG. 1A depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Additionally, optionally or alternatively, video frames (102) may be captured on film by a film camera. The film is converted to a digital format to provide the video data (107). In a production phase (110), the video data (107) is edited to provide a video production stream (112).

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of HDR images (117-1) or SDR (or relatively narrow dynamic range) images (117) (e.g., SDR, etc.). In some embodiments, during post-production editing (115), the HDR images (117-1) are viewed on a reference HDR display that supports the high dynamic range by a colorist who is performing post-production editing operations on the HDR images (117-1). Additionally, optionally or alternatively, during post-production editing (115), the SDR images (117) are viewed on a reference display (125) that supports the standard dynamic range (or a relatively narrow dynamic range) by a colorist who is performing post-production editing operations on the SDR images (117). Additionally, optionally or alternatively, the SDR images (117) may be content mapped from the HDR images (117-1).

In some embodiments, the coding block (120) may implement some or all of a variety of adjustable trade-offs between decoder-side quality of reconstructed HDR image data and encoder-side computational complexity of backward reshaping mappings. The coding block (120) receives the HDR images (117-1) from the post-production editing (115), and forward reshapes the HDR images (117-1) into (forward) reshaped SDR images.

The reshaped SDR images can be compressed/encoded by the coding block (120) into a coded bitstream (122), for example in a single layer. Example single layer video coding operations are described in U.S. patent application Ser. No. 16/087,241, filed on Mar. 22, 2017, and published as U.S. Patent Application Publication Ser. No. 2019/0110054, the entire contents of which are hereby incorporated by reference as if fully set forth herein.

In some embodiments, the coding block (120) may include audio and video encoders, such as those defined by ATSC, DVB, DVD, Blu-Ray, and other delivery formats, to generate the coded bitstream (122).

The reshaped SDR images may be encoded into video data in a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the reshaped SDR images may be a single-layer backward compatible video signal. Here, a "single-layer backward compatible video signal" may refer to a video signal that carries SDR images that are specifically optimized or color graded for SDR displays in a single signal layer.

In some embodiments, the coded bitstream (122) outputted by the coding block (120) may represent an output 8-bit SDR video signal with the image metadata including but not limited to backward reshaping mappings as generated by the coding block (120). Under techniques as described herein, the backward reshaping mappings (or composer metadata) are generated based on a specific set of adjustable trade-off options—which for example are made or selected by content providers and/or content consumers of an end-to-end single-layer backward compatible encoding pipeline including the coding block (120)—between decoder-side quality of reconstructed HDR image data and encoder-side computational complexity of the backward reshaping mappings.

The backward reshaping mappings can be used by downstream decoders to perform backward reshaping (e.g., inverse tone mapping, etc.) on the reshaped SDR images in order to generate backward reshaped images that may be optimized for rendering on an HDR (e.g., reference, etc.) display. In some embodiments, the backward reshaped images may be generated from the reshaped SDR images (or a decoded version thereof) using one or more SDR-to-HDR conversion tools implementing inverse tone mapping based at least in part on the backward reshaping mappings (or composer metadata). A used herein, backward reshaping refers to image processing operations that convert re-quantized images back to the original EOTF domain (e.g., gamma, PQ, hybrid log gamma or HLG, etc.), for further downstream processing, such as the display management. Example backward reshaping operations are described in U.S. Provisional Application Ser. No. 62/136,402, filed on Mar. 20, 2015, (also published on Jan. 18, 2018, as U.S. Patent Application Publication Ser. No. 2018/0020224), the entire contents of which are hereby incorporated by reference as if fully set forth herein.

Additionally, optionally, or alternatively, the coded bit stream (122) is encoded with additional image metadata including but not limited to display management (DM) metadata that can be used by the downstream decoders to perform display management operations on the backward reshaped images for the HDR reference displays to generate display images optimized for rendering on other displays such as non-reference HDR displays, etc.

The coded bitstream (122) is then delivered downstream to receivers such as decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as the reshaped SDR images, subject to quantization errors generated in compression performed by the coding block (120) and decompression performed by the decoding block (130).

In operational scenarios in which the receiver operates with (or is attached to) a target display 140 that supports the standard dynamic range or a relatively narrow dynamic range comparable with or less than the standard dynamic range, the decoding block (130) can decode the reshaped SDR images from (e.g., the single layer in, etc.) the coded bitstream (122), and use the decoded reshaped SDR images directly or indirectly for rendering on the target display (140). In embodiments in which the target display (140) is of similar characteristics as the SDR reference display (125), the reshaped SDR images can be directly watchable on the target display (140).

In some embodiments, the receiver operates with (or is attached to) a HDR target display 140-1 that supports a high dynamic range (e.g., 400 nits, 1000 nits, 4000 nits, 10000 nits or more, etc.) can extract the composer metadata from (e.g., the metadata container in, etc.) the coded bitstream (122), use the backward reshaping metadata (composer metadata) to compose backward reshaped images 132-1 from the reshaped SDR images by backward reshaping the reshaped SDR images based on the backward reshaping metadata (composer metadata), and use the backward reshaped images (132-1) directly or indirectly for rendering on the HDR target display (140-1).

The backward reshaped images (132-1) may be optimized for viewing on an HDR (e.g., reference, etc.) display that is not the same but rather is comparable with—for example, supports a maximum or peak luminance value greater than that of—the HDR target display (140-1). A display management block (e.g., 135-1, etc.)—which may be in the receiver, in the HDR target display (140-1), or in a separate device—further adjusts the backward reshaped images (132-1) to characteristics of the HDR target display (140-1) by generating a display-mapped signal (137-1) adapted to the characteristics of the HDR target display (140-1).

Video Codecs and Trade-Offs Between Quality and Complexity

Figure 1B:
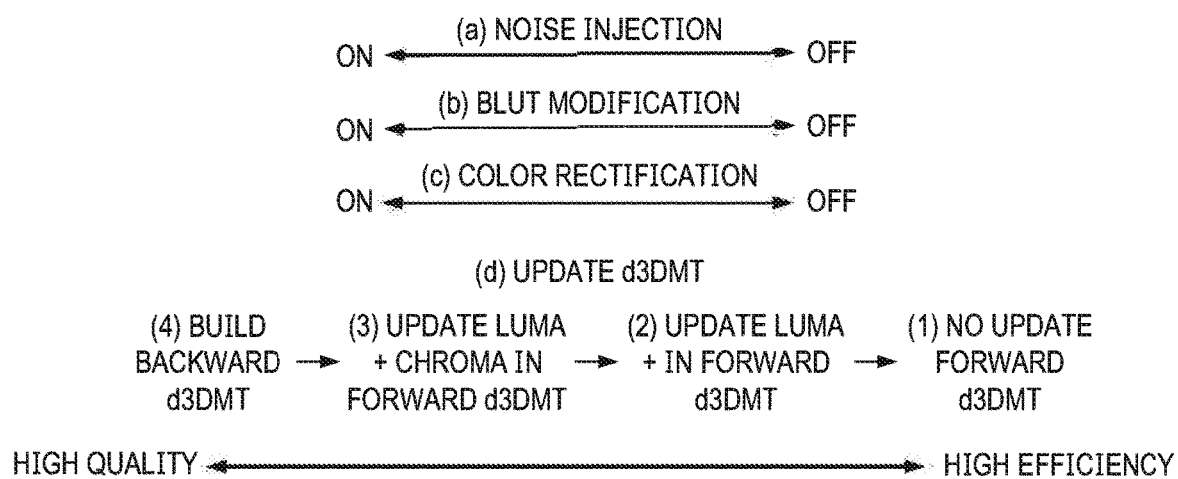
FIG. 1B illustrates example trade-offs between quality of reconstructed images and computational complexity of generation mappings to create the reconstructed images.

FIG. 1B illustrates example trade-offs between decoder-side of quality of reconstructed HDR images and encoder-side computational complexity of generation of backward reshaping mappings. A coding block (e.g., video encoder, video transcoder, media streaming system, content providing system, etc.) as described herein may be (e.g., dynamically, statically, adaptively, scheduled to be, independently, etc.) configured with a specific set of trade-off options selected by a content provider and/or a content consumer operating with a video processing system including the coding block.

As illustrated in FIG. 1B, example trade-offs may include, but are not necessarily limited to only, enabling or disabling (turning on or off) any of: (a) noise injection, (b) BLUT modification, (c) color rectification, etc., as well as (d) selecting different options in updating (or building) d3DMTs. In some operational scenarios, enabling BLUT modification and color rectification can alleviate banding artifacts, improve color appearance, and thus improve the overall quality of the reconstructed HDR images.

Example trade-off options (e.g., selectable or adjustable in the coding block, etc.) in updating (or building) d3DMTs may include, but are not necessarily limited to only, (1) no updating to forward d3DMTs, (2) updating the luma channel/plane in forward d3DMTs, (3) updating the luma and chroma channels/planes in forward d3DMTs, (4) building backward d3DMTs based on source HDR images and forward reshaped SDR images, and so forth. As shown in FIG.

1B, these different options provide different color grades of decoder-side quality of reconstructed HDR images and/or different computational complexity (or efficiency) of encoder-side generation of backward reshaping mappings.

Figure 2A:
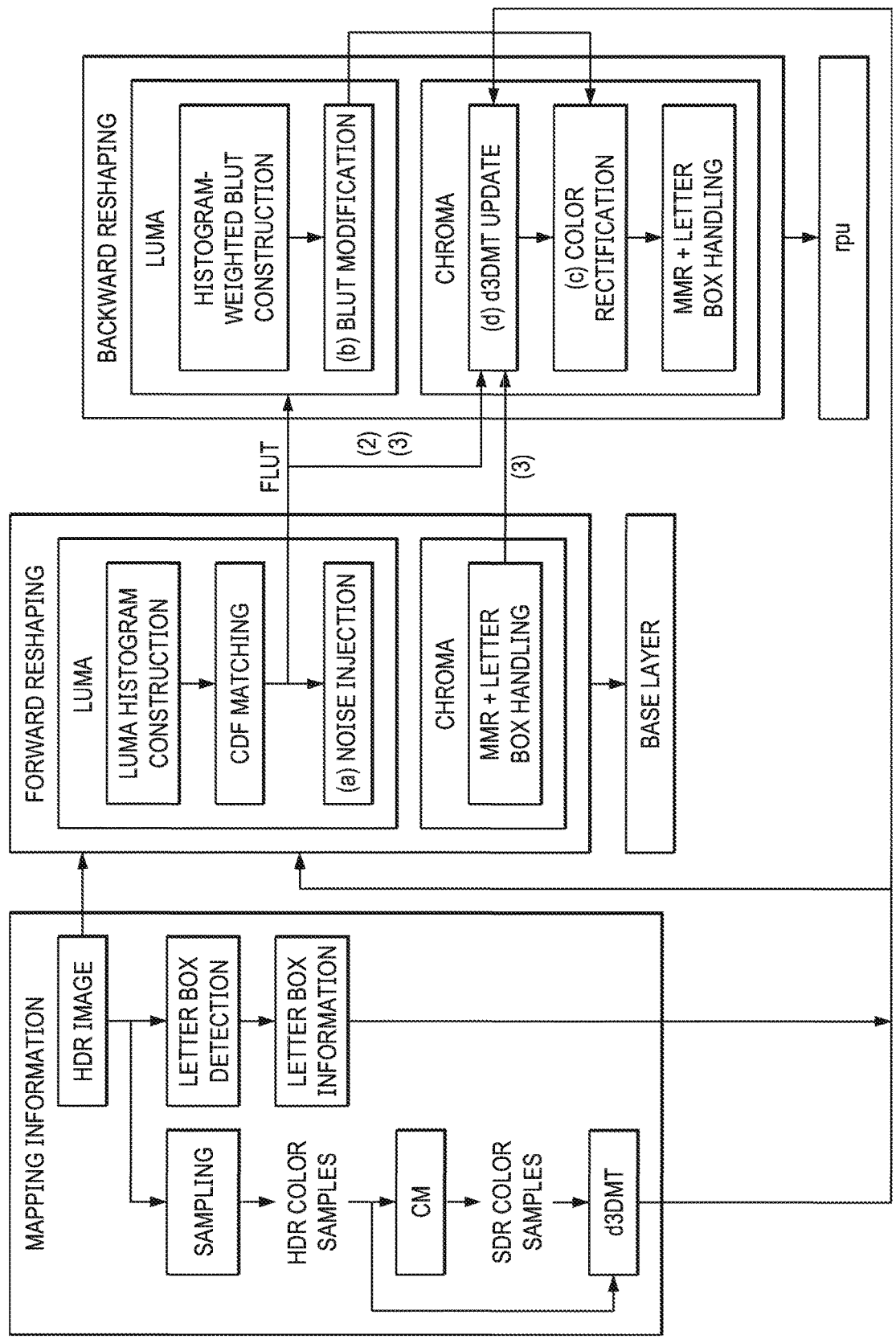
FIG. 2A through FIG. 2C illustrate example codecs.
Figure 2B:
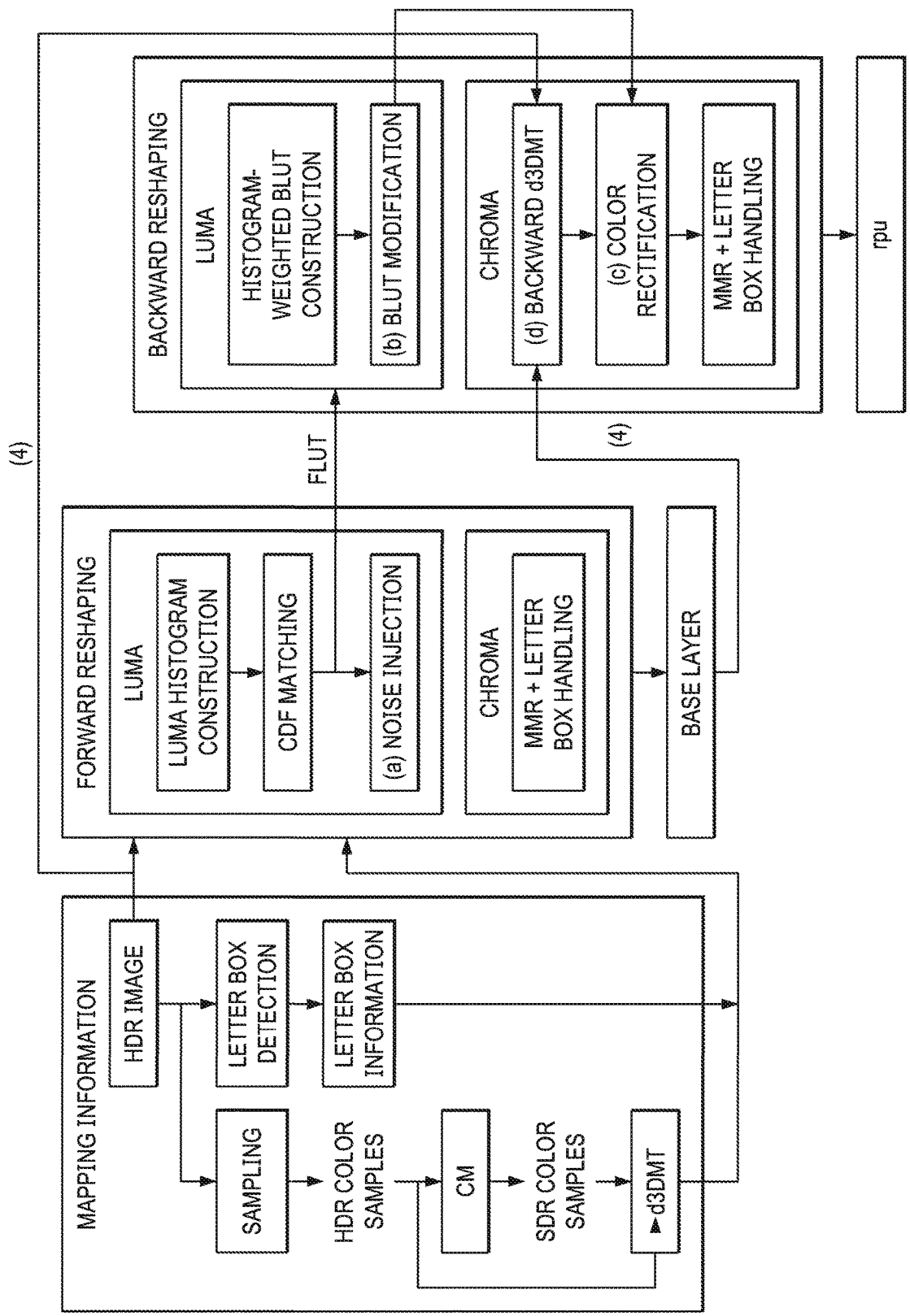

FIG. 2A and FIG. 2B illustrate example video codecs such as video encoders (e.g., the coding block (120) of FIG. 1A, etc.) in end-to-end video delivery pipelines. An end-to-end video delivery pipeline as described herein or a device therein may be implemented by more or fewer processing blocks than those illustrated herein with one or more computing devices in software, hardware, a combination of software and hardware, etc. By way of illustration but not limitation, some or all processing flows and/or data flows are marked with numbers or alphabets in parentheses. As illustrated in FIG. 2A and FIG. 2B, any, some or all of these processing blocks may be optional depending on which specific set of trade-off options (e.g., as illustrated in FIG. 1B, etc.) selected or made (e.g., by a content provider user, by a content consumer user, etc.) is used to configure video codes in end-to-end video delivery pipelines.

As illustrated in FIG. 2A and FIG. 2B, a video encoder as described herein comprises a "Mapping Information" block for generating HDR-to-SDR mapping information, a "Forward Reshaping" block for generating a revertible SDR image (or a forward reshaped SDR image), a "Backward Reshaping" block for generating image metadata (denoted as "RPU" or "rpu") that may include backward reshaping mappings to be used by a recipient device to reconstruct an HDR image (e.g., backward reshaped from the revertible SDR, etc.) that looks as close to an input or reference HDR image as possible.

In the video encoder of FIG. 2A, some or all of (a) noise injection, (b) BLUT modification and (c) color rectification as illustrated in FIG. 1B may be enabled and one of options (d)(2) or (d)(3) of updating d3DMTs as illustrated in FIG. 1B is selected. As previously noted, option (d)(2) of FIG. 1B corresponds to updating (e.g., only, etc.) the luma channel/plane in forward d3DMTs, whereas option (d)(3) of FIG. 1B corresponds to updating the luma and chroma channels/planes in forward d3DMTs.

The "Mapping Information" block of FIG. 2A comprises sampling (or drawing) HDR color samples from the reference HDR image, applying content mapping (CM; e.g., manipulations/operations performed based on artistic or colorist intent, color grading operations, etc.) to these HDR color samples to generate corresponding SDR color samples, etc. Example sampling strategies used to sample HDR color samples from a source or reference HDR image may include, but are not necessarily limited to only, any of: sampling every pixel of the reference HDR images, sampling a relatively small set (e.g., ½, ¼, ⅛, 1/16, etc.) of the reference HDR images, sampling uniformly or non-uniformly in spatial dimensions of the reference HDR images, sampling uniformly or non-uniformly in a luminance distribution of luminance codewords/values in the reference HDR images, and so forth.

In a mapping information stage, based at least in part on a sampling strategy, a 3D sampling grid (e.g., a rectilinear 3D grid, a sparse 3D grid, a 3D grid with even or uneven distribution/density of vertices, etc.) may be constructed. In various embodiments, sample points may or may not be selected based on 3D sampling grid. In some embodiments, sample points may be selected based on a density distribution; for example, the sample points may be selected according to whether the color present in the picture as indicated in the density distribution. The CM may be used to generate (e.g., only, etc.) content mappings from HDR sample points to corresponding SDR sample points. The content mappings may comprise a set of content mappings at a relatively small number of sample points (e.g., 10,000 sample points, etc.) rather than content mappings from all HDR pixels (e.g., 2 million pixels or more for an image of a 1920×1080 spatial resolution, etc.) to all corresponding SDR pixels, and thus is much lighter to generate than all content mappings for all pixels.

The HDR (e.g., color, codeword, etc.) samples and the corresponding SDR (e.g., color, codeword, etc.) samples are used to form mapping pairs used as samples to construct or populate a forward d3DMT (e.g., multi-dimensional mapping table, histogram, etc.). The "Mapping Information" block of FIG. 2A may further comprise collecting letter box information from the HDR image, including but not limited to whether a letter box exists in the HDR image and, if so, the pixel value of the letter box.

A video encoder may implement high-efficiency reduced reference (HERR) codec architecture as described in PCT/US2019/031620 to reduce computational complexity. Mapping side information—instead of a reference SDR image comprising (e.g., all, substantially all, etc.) pixel values of (e.g., all, substantially all, etc.) individual pixels—can be sent from a mapping information stage to later processing stages such as a forward reshaping stage, a backward reshaping stage, and so forth, of the video encoder. In the HERR encoding operations, a source (or reference) HDR image and the mapping side information associated with the source (or reference) HDR image are used by the later processing stages to construct forward reshaping function(s) (e.g., FLUT, MMR coefficients, etc.), to generate a (forward) reshaped SDR image by forward reshaping the source HDR image based on the forward reshaping function(s), generate backward reshaping image metadata to be used by a recipient device (or a recipient video decoder) to generate a reconstructed HDR image closely approximating the source HDR image, to encode the reshaped SDR image with the backward reshaping image metadata in a SLBC video signal, and so forth. In some operational scenarios, the mapping side information may include a reduced number of colors as compared with those represented in the full reference SDR image.

In a high-fidelity full-reference (HFFR) mode, described in PCT/US2019/031620, a reference SDR image is generated by applying content mapping (e.g., color mapping, etc.) to each pixel of the source HDR image, used to build a d3DMT for chroma forward reshaping. In the HFFR mode, the reference SDR image is not encoded into a SLBC video signal, but rather serves as an approximation reference for building the d3DMT for chroma forward reshaping. Thus, in the HFFR mode, there are many encoding related operations performed at each individual pixel level (e.g., for each of millions of pixels in an image, etc.).

In contrast, in a HERR mode, described in PCT/US2019/031620, a d3DMT can be generated from the mapping side information such as content mapping information (e.g., color mapping information, etc.) at a reduced number (e.g., 10,000, much fewer than millions, etc.) of points without generating or operating with the full reference SDR image at each individual pixel level. As a result, a large amount of computation or encoding related operations can be saved or avoided.

As in the full-reference mode, to generate the mapping side information at a mapping information stage in the reduced-reference mode, codewords in the source HDR image (denoted as frame t) can be partitioned into Q bins for each color channel based on minimum and maximum codeword value in each such channel. In total, there are $Q \times Q \times Q$ 3D bins. Denote the un-normalized minimum codeword value as $L_t^{EDR,ch}$, and the un-normalized maximum codeword value as $H_t^{EDR,ch}$, where channel ch={Y,$C_0$,$C_1$}. The range of bin j is given as follows:

$$\left[ L_t^{EDR,ch} + \frac{j \cdot 2^{b_{EDR}}}{g_t^{ch} \cdot Q}, \; L_t^{EDR,ch} + \frac{(j+1) \cdot 2^{b_{EDR}}}{g_t^{ch} \cdot Q} \right] \quad (1)$$

where $$g_t^{ch} = \left\lfloor \frac{2^{b_{EDR}} - 1}{\left(H_t^{EDR,ch} - L_t^{EDR,ch}\right)} \right\rfloor$$

and $j \in \{0, 1, \ldots, Q-1\}$, and where $b_{EDR}$ is the bit depth of HDR (or EDR).

A 3D histogram (denoted as $\Omega_t^{Q,EDR}$) for HDR pixel values (or codeword values) is collected with each 3D bin in the 3D histogram specified by a bin index $q=(q^Y, q^{C_0}, q^{C_1})$. Channel-specific sums (denoted $\Psi_{t,Y,q}^{Q,EDR}$, $\Psi_{t,C_0,q}^{Q,EDR}$ and $\Psi_{t,C_1,q}^{Q,EDR}$) of HDR pixel values in each 3D bin are computed, respectively. For a non-empty bin (of the 3D histogram $\Omega_t^{Q,EDR}$ having a non-zero number of pixels, channel-specific average HDR pixel values (or codeword values) (denoted as $[\bar\Psi_{t,Y,q}^{Q,EDR}, \bar\Psi_{t,C_0,q}^{Q,EDR}$ and $\bar\Psi_{t,C_1,q}^{Q,EDR}]$) can be computed for all color channels, respectively; mapped SDR pixel values for the HDR pixel values represented in the non-empty bin may also be determined or computed using the content mapping at the average HDR pixel values for all color channels, respectively. Denote $\{q_0, q_1, \ldots, q_{K_t-1}\}$ as $K_t$ bins where $\Omega_{t,q}^{Q,EDR} \neq 0$. Denote the mapped SDR pixel values $\check\Psi_{t,Y,q}^{Q,SDR}$, $\check\Psi_{t,C_0,q}^{Q,SDR}$ and $\check\Psi_{t,C_1,q}^{Q,SDR}$. An example procedure for collecting mapping statistics such as channel-specific average HDR pixel values $[\bar\Psi_{t,Y,q}^{Q,EDR}, \bar\Psi_{t,C_0,q}^{Q,EDR}$ and $\bar\Psi_{t,C_1,q}^{Q,EDR}]$ and the mapped SDR pixel values $\check\Psi_{t,Y,q}^{Q,SDR}$, $\check\Psi_{t,C_0,q}^{Q,SDR}$ and $\check\Psi_{t,C_1,q}^{Q,SDR}$ is shown in TABLE 1 below.

TABLE 1

```
// STEP 1: 3D source histogram and 3DMT initialization
Ω_{t,q}^{Q,EDR} = 0 where q = (q^Y, q^{C_0}, q^{C_1}) and q^{ch} = 0,..., Q − 1, for each ch = {Y, C_0, C_1}
Ψ_{t,Y,q}^{Q,EDR} = 0 where q = (q^Y, q^{C_0}, q^{C_1}) and q^{ch} = 0,..., Q − 1, for each ch = {Y, C_0, C_1}
Ψ_{t,C_0,q}^{Q,EDR} = 0 where q = (q^Y, q^{C_0}, q^{C_1}) and q^{ch} = 0,..., Q − 1, for each ch = {Y, C_0, C_1}
Ψ_{t,C1,q}^{Q,EDR} = 0 where q = (q^Y, q^{C_0}, q^{C_1}) and q^{ch} = 0,..., Q − 1, for each ch = {Y, C_0, C_1}
// STEP 2: scan for each pixel in the source and reference
// The number of pixels in the chroma plane is P
// s_{t,i}^{ch} is the un-normalized value of pixel i of channel ch in frame t of the HDR (or EDR)
image
for( i = 0; i < P; i ++ ){
```

$$q^Y = \left\lfloor \frac{\left(s_{t,i}^Y - L_t^{EDR,Y}\right) \cdot g_t^Y}{2^{b_{EDR}}} \cdot Q \right\rfloor; \qquad \text{// source luma quantized value}$$

$$q^{C_0} = \left\lfloor \frac{\left(s_{t,i}^{C_0} - L_t^{EDR,C_0}\right) \cdot g_t^{C_0}}{2^{b_{EDR}}} \cdot Q \right\rfloor; \qquad \text{// source chroma 0 quantized value}$$

$$q^{C_1} = \left\lfloor \frac{\left(s_{t,i}^{C_1} - L_t^{EDR,C_1}\right) \cdot g_t^{C_1}}{2^{b_{EDR}}} \cdot Q \right\rfloor; \qquad \text{// source chroma 1 quantized value}$$

$\Omega_{t,q}^{Q,EDR}$ ++ ;      // 3D source histogram $$\Psi_{t,Y,q}^{Q,EDR} = \Psi_{t,Y,q}^{Q,EDR} + \frac{s_{t,i}^Y}{2^{b_{EDR}}}; \qquad \text{// sum of source Y values}$$

$$\Psi_{t,C_0,q}^{Q,EDR} = \Psi_{t,C_0,q}^{Q,EDR} + \frac{s_{t,i}^{C_0}}{2^{b_{EDR}}}; \qquad \text{// sum of source } C_0 \text{ values}$$

$$\Psi_{t,C_1,q}^{Q,EDR} = \Psi_{t,C_1,q}^{Q,EDR} + \frac{s_{t,i}^{C_1}}{2^{b_{EDR}}}; \qquad \text{// sum of source } C_1 \text{ values}$$

```
}
K_t = 0;
for ( q^Y = 0; q^Y < Q; q^Y ++ )
    for ( q^{C_0} = 0; q^{C_0} < Q; q^{C_0} ++ )
        for ( q^{C_1} = 0; q^{C_1} < Q; q^{C_1} ++) {
            if (Ω_{t,q}^{Q,EDR} ≠ 0 ) {
```

$$\bar\Psi_{t,Y,q}^{Q,EDR} = \frac{\Psi_{t,Y,q}^{Q,EDR}}{\Omega_{t,q}^{Q,EDR}}; \qquad \text{// Average source Y values}$$

$$\bar\Psi_{t,C_0,q}^{Q,EDR} = \frac{\Psi_{t,C_0,q}^{Q,EDR}}{\Omega_{t,q}^{Q,EDR}}; \qquad \text{// Average source } C_0 \text{ values}$$

TABLE 1-continued $$\Psi_{t,C_1,q}^{Q,EDR} = \frac{\Psi_{t,C_1,q}^{Q,EDR}}{\Omega_{t,q}^{Q,EDR}};$$  // Average source $C_1$ values Obtain the corresponding SDR chroma values: $\tilde{\Psi}_{t,Y,q}^{Q,SDR}$, $\tilde{\Psi}_{t,C_0,q}^{Q,SDR}$ and $\tilde{\Psi}_{t,C_1,q}^{Q,SDR}$
by applying content mapping to the HDR (or EDR) value
$[\Psi_{t,Y,q}^{Q,EDR}, \Psi_{t,C_0,q}^{Q,EDR}, \Psi_{t,C_1,q}^{Q,EDR}]$;

$K_t$ ++; // count the number of non-zero bins
}
}

As can be seen in TABLE 1 above, unlike the full-reference mode, the mapped SDR pixel values in the reduced-reference mode are obtained by applying content mapping (e.g., color mapping, etc.) to HDR pixel values at the sampled points, instead of averaging the individual SDR pixel values in a reference SDR image. Such content mapping may be applied only to the non-zero bins of the 3D histogram $\Omega_t^{Q,EDR}$ representing the d3DMT. The d3DMT represented by the 3D histogram $\Omega_t^{Q,EDR}$ comprising sampled HDR and SDR codeword statistics $\{\Psi_{t,Y,q_k}^{Q,EDR}\}$, $\{\Psi_{t,C_0,q_k}^{Q,EDR}\}$, $\{\Psi_{t,C_1,q_k}^{Q,EDR}\}$, $\{\tilde{\Psi}_{t,Y,q_k}^{Q,SDR}\}$, $\{\tilde{\Psi}_{t,C_0,q_k}^{Q,SDR}\}$, $\{\tilde{\Psi}_{t,C_1,q_k}^{Q,SDR}\}$, along with the histograms $\{\Omega_{t,q_k}^{Q,EDR}\}$ may be sent as the mapping side information from the mapping information stage to a forward reshaping stage and/or a backward reshaping stage and used to construct forward and backward reshaping functions in the forward reshaping stage and the backward reshaping stage.

The "Forward Reshaping" block of FIG. 2A comprises using the forward d3DMT to construct (e.g., 1D, etc.) luma histograms of HDR luma samples (e.g., luma components of the HDR samples, etc.) and SDR luma samples (e.g., luma components of the corresponding SDR samples, etc.) obtained from the forward d3DMT, applying cumulative density function (CDF) matching to form or generate a forward lookup table (FLUT) for luma channel/plane, etc. Example CDF matching operations are described in PCT Application No. PCT/US2017/50980, filed on Sep. 11, 2017; U.S. Provisional Application Ser. No. 62/404,307, filed on Oct. 5, 2016, (also published in Apr. 5, 2018, as U.S. Patent Application Publication Ser. No. 2018/0098094), the entire contents of which are hereby incorporated by reference as if fully set forth herein.

In some embodiments, CDF matching can be employed to build a forward reshaping look-up table (FLUT). 1D luma histograms may be constructed using a d3DMT generated from source HDR codeword values and SDR codeword values at sampled points (e.g., a sampling grid in each of the HDR and SDR image frames, etc.), not from a source HDR image and a reference SDR image at each unsampled pixel level. Since a 3D histogram representing the d3DMT is already available in the mapping side information from a mapping information stage, a forward reshaping stage can build the 1D luma histogram by summing up in the 3D histogram all 3D bins whose luma values correspond to the same luma bin in the 1D luma histogram.

CDF matching may be performed by a CDF matching block to generate an interpolated FLUT based on the 1D luma histogram. The interpolated FLUT may be smoothened to generate a smoothed FLUT. In addition, a backward reshaping LUT (BLUT) may be constructed by a BLUT construction block 456 using codeword mappings or curve (e.g., 8-piece second order polynomials, etc.) represented in the smoothened FLUT.

Two example methods or procedures for build the 1D luma histograms with different computational costs are illustrated in TABLEs 2 and 3 below. In the first method as illustrated in TABLE 2, the centroid of each bin is computed. CDF matching is performed using the centroids. This requires relatively high-cost computation but generate mappings with relatively high precision. In the second method as illustrated in TABLE 3, each bin is represented by its mid-point, which can be easily determined with relatively low-cost computation. The two methods are presented in the following.

TABLE 2

// initialization
$\bar{h}_t^{EDR}$ (n) = 0 for n = 0,..., Q-1;
$\bar{h}_t^{SDR}$ (n) = 0 for n = 0, ... , Q-1;
$\bar{v}_t^{EDR}$ (n) = 0 for n = 0,..., Q-1;
$\bar{v}_t^{SDR}$ (n) = 0 for n = 0, ... , Q-1;
// STEP 1: build histograms for HDR (or EDR) and SDR from mapping side information
for ( k = 0; k < $K_t$; k++){
    extract HDR (or EDR) luma value, $\Psi_{t,Y,q_k}^{Q,EDR}$;
    extract SDR luma value, $\tilde{\Psi}_{t,Y,q_k}^{Q,SDR}$;
    // find the bin index in the 1D luma histograms
    $n^{EDR}$ = round ($\Psi_{t,Y,q_k}^{Q,EDR} \cdot Q$) ;
    $n^{SDR}$ = round ($\tilde{\Psi}_{t,Y,q_k}^{Q,SDR} \cdot Q$) ;
    // accumulate 1D luma histograms
    $\bar{h}_t^{EDR}(n^{EDR}) = \bar{h}_t^{EDR}(n^{EDR}) + \Omega_{t,q_k}^{Q,EDR}$ ;
    $\bar{h}_t^{SDR}(n^{SDR}) = \bar{h}_t^{SDR}(n^{SDR}) + \Omega_{t,q_k}^{Q,EDR}$ ;
    // find the centroid of the bin
    $\bar{v}_t^{EDR}(n^{EDR}) = \bar{v}_t^{EDR}(n^{EDR}) + \Omega_{t,q_k}^{Q,EDR} \cdot \Psi_{t,Y,q_k}^{Q,EDR}$ ;
    $\bar{v}_t^{SDR}(n^{SDR}) = \bar{v}_t^{SDR}(n^{SDR}) + \Omega_{t,q_k}^{Q,EDR} \cdot \tilde{\Psi}_{t,Y,q_k}^{Q,SDR}$ ;
}
// STEP 2: if a bin has non-zero pixels, use the centroid of the bin as the sample point;
otherwise use the mid-point of the bin
for ( n = 0; n < Q; n++ ) {

TABLE 2-continued

```
if ( h_t^{EDR} (n) > 0 )
    ṽ_t^{EDR} (n) = ṽ_t^{EDR} (n)/h̃_t^{EDR} (n); // bin centroid
else
```

$$\tilde{v}_t^{EDR}(n) = \frac{n+0.5}{Q};$$

// bin mid-point

```
if ( h̃_t^{SPR} (n) > 0 )
    ṽ_t^{SDR} (n) = ṽ_t^{SDR} (n)/h̃_t^{SDR} (n); // bin centroid
else
```

$$\tilde{v}_t^{SDR}(n) = \frac{n+0.5}{Q};$$

// bin mid-point

}
// STEP 3: perform CDF matching
Obtain transfer function $F_t^Q$ (n) via CDF matching based on $\{\tilde{h}_t^{EDR}(n)\}$ and $\{\tilde{h}_t^{SDR}(n)\}$, where the SDR sample point of each bin is $\{\tilde{v}_t^{SDR}(n)\}$.
// STEP 4: perform interpolation
bi-linear interpolation from Q-bin $F_t^Q$ (n) to full $b_{EDR}$-bit $F_t^{EDR}$ (·), where the Q sample points are $\{\tilde{v}_t^{EDR}(n)\}$.
// STEP 5: perform smoothing
The interpolated FLUT is not smooth enough for us to construct the backward reshaping LUT and approximated by 8-piece $2^{nd}$ order polynomial. We need to use average filter to smooth the non-flat region of the FLUT. Assume the start point of the non-flat region is $x_1$, and the end point of the non-flat region is $x_2$.

$$FLUT_t(x) = \sum_{k=-W}^{W} \frac{1}{2W+1} F_t^{EDR}(x+k) \text{ for } x = x_1, x_1+1, \ldots, x_2$$

// STEP 6: construct the backward reshaping LUT by tracking back FLUT.
//approximate histograms of HDR (or EDR) at each codeword using $\{\tilde{h}_t^{EDR}(n)\}$:
for ( k = 0; k < $2^{b_{EDR}}$ ; k++ ){

$$n = \left\lfloor \frac{k}{2^{b_{EDR}}} \cdot Q \right\rfloor;$$

$$h_t^{EDR}(k) = \frac{\tilde{h}_t^{EDR}(n)}{Q};$$

}
Obtain BLUT using FLUT, and {hEDR (k)} .

TABLE 3

```
// initialization
h̃_t^{EDR} (n) = 0 for n =0,..., Q-1;
h̃_t^{SDR} (n) = 0 for n =0,..., Q-1;
// STEP 1: build histograms for HDR (or EDR) and SDR from mapping table
for( k = 0; k < K_t; k++){
    extract EDR luma value, Ψ_{t,Y,q_k}^{Q,EDR} ;
    extract EDR luma value, Ψ_{t,Y,q_k}^{Q,SDR} ;
    // find bin index in the 1D luma histograms
    n^{EDR} = round (Ψ_{t,Y,q_k}^{Q,EDR} · Q) ;
    n^{SDR} = round (Ψ_{t,Y,q_k}^{Q,SDR} · Q) ;
    // accumulate 1D luma histograms
    h̃_t^{EDR} (n^{EDR}) = h̃_t^{EDR} (n^{EDR}) + Ω_{t,q_k}^{Q,EDR} ;
    h̃_t^{SDR} (n^{SDR}) = h̃_t^{SDR} (n^{SDR}) + Ω_{t,q_k}^{Q,EDR} ;
}
// STEP 2: compute mid-points of bins
for ( n = 0; n < Q; n++ ) {
    // bin mid-point
```

$$\tilde{v}_t^{EDR}(n) = \frac{n+0.5}{Q};$$

$$\tilde{v}_t^{SDR}(n) = \frac{n+0.5}{Q};$$

}

TABLE 3-continued

```
// STEP 3: perform CDF matching
Obtain transfer function $F_t^Q(n)$ via CDF matching based on $\{\bar{h}_t^{EDR}(n)\}$ and $\{\bar{h}_t^{SDR}(n)\}$,
where the SDR sample point of each bin is $\{\bar{v}_t^{SDR}(n)\}$.
// STEP 4: perform interpolation
bi-linear interpolation from Q-bin $F_t^Q(n)$ to full $b_{EDR}$ -bit $F_t^{EDR}(\cdot)$, where the Q sample
points are $\{\bar{v}_t^{EDR}(n)\}$.
// STEP 5: perform smoothing
The interpolated FLUT is not smooth enough for us to construct the backward reshaping
LUT and approximated by 8-piece $2^{nd}$ order polynomial. We need to use average filter to
smooth the non-flat region of the FLUT. Assume the start point of the non-flat region is
$x_1$, and the end point of the non-flat region is $x_2$.
```

$$FLUT_t(x) = \sum_{k=-W}^{W} \frac{1}{2W+1} F_t^{EDR}(x+k) \text{ for } x = x_1, x_1+1, \ldots, x_2$$

```
// STEP 6: construct the backward reshaping LUT by tracking back FLUT.
//approximate histograms of HDR (or EDR) at each codeword using $\{\bar{h}_t^{EDR}(n)\}$:
for ( k = 0; k < $2^{b_{EDR}}$ ; k++ ){
```

$$n = \left\lfloor \frac{k}{2^{b_{EDR}}} \cdot Q \right\rfloor;$$

$$h_t^{EDR}(k) = \frac{\bar{h}_t^{EDR}(n)}{Q};$$

```
}
Obtain BLUT using $FLUT_t$ and $\{h_t^{EDR}(k)\}$.
```

In some operational scenarios, block standard deviations (denoted as "BLKSTDs") are computed from the HDR image. A risk of banding artifact is estimated from the BLKSTDs (as computed from the HDR image) and the FLUT (as constructed with CDF matching). Noise, whose strength depends on the risk of banding artifact and/or luminance levels of the HDR image, may be injected (in the "(a) Noise injection" sub-block) into dark part(s) or sub-range(s) of the HDR luma channel/plane of the HDR image.

Example block standard deviation computation and banding artifact risk estimation are described in U.S. Pat. No. 10,032,262, the entire contents of which are hereby incorporated by reference as if fully set forth herein.

Additionally, optionally or alternatively, letterbox handling operations can be performed to handle any letterbox that may exists in the reference HDR image to help ensure correct colors in the forward reshaped SDR image and/or the reconstructed HDR image. Example letterbox handling operations are described in previously mentioned PCT Patent Application No. PCT/US2019/031620.

The BL luma channel/plane/component of a corresponding forward reshaped SDR image can be generated by applying the FLUT to the dithered (or noise-injected) HDR luma channel/plane of the HDR image.

The BL chroma channels/planes/components of the corresponding forward reshaped SDR image can be generated by applying forward MMR coefficients to HDR chroma channels/planes of the HDR image. The forward MMR coefficients (representing chroma forward reshaping mappings) can be computed from the forward d3DMT and the letter box information.

The d3DMT from a mapping information stage may be received by an unconstrained MMR matrix construction in a forward reshaping stage. An unconstrained least-squares problem may be formulated to solve for MMR coefficients that are to be used to forward reshape chroma codewords (including any letterbox source HDR chroma codewords if applicable) in a source HDR image into reshaped chroma codewords (including any letterbox reshaped SDR chroma codewords if applicable) in a reshaped SDR image.

From a d3DMT provided in mapping side information, two vectors can be constructed using the SDR chroma values of the non-zero bins (or the non-empty bins) of the 3D histogram representing the d3DMT, as follows:

$$v_t^{C_0,fwd} = \begin{bmatrix} \Psi_{t,C_0,q_0}^{Q,SDR} \\ \Psi_{t,C_0,q_1}^{Q,SDR} \\ \vdots \\ \Psi_{t,C_0,q_{K_t-1}}^{Q,SDR} \end{bmatrix}, v_t^{C_1,fwd} = \begin{bmatrix} \Psi_{t,C_1,q_0}^{Q,SDR} \\ \Psi_{t,C_1,q_1}^{Q,SDR} \\ \vdots \\ \Psi_{t,C_1,q_{K_t-1}}^{Q,SDR} \end{bmatrix} \quad (2)$$

Further, a matrix can be constructed using the average HDR pixel values of the non-zero bins, as follows:

$$S_t^{fwd} = \begin{bmatrix} p_{t,q_0}^{fwd^T} \\ p_{t,q_1}^{fwd^T} \\ \vdots \\ p_{t,q_{K_t-1}}^{fwd^T} \end{bmatrix} \quad (3)$$

where $$p_{t,q_k}^{fwd^T} = [1 \; \Psi_{t,Y,q_k}^{Q,EDR} \Psi_{t,C_0,q_k}^{Q,EDR} \Psi_{t,C_1,q_k}^{Q,EDR} \\ \Psi_{t,Y,q_k}^{Q,EDR} \Psi_{t,C_0,q_k}^{Q,EDR} \Psi_{t,Y,q_k}^{Q,EDR} \\ \Psi_{t,C_1,q_k}^{Q,EDR} \ldots ] \quad (4)$$

which contains all supported MMR terms.

Let $$A_t^{fwd} = (S_t^{fwd})^t S_t^{fwd}, b_t^{C_0,fwd} = (S_t^{fwd})^T v_t^{C_0,fwd}, b_t^{C_1,fwd} = (S_t^{fwd})^T v_t^{C_1,fwd} \quad (5)$$

The unconstrained MMR coefficients may be obtained in a closed form by solving the unconstrained least-squares problem using the unconstrained MMR matrix, as follows:

$$x_t^{C_0,fwd}=(A_t^{fwd})^{-1}b_t^{C_0,fwd}, x_t^{C_1,fwd}=(A_t^{fwd})^{-1}b_t^{C_1,fwd} \quad (6)$$

The "Backward Reshaping" block of FIG. 2A comprises constructing a backward lookup table (BLUT) for luma channel/plane from the FLUT using a histogram-based method such as a histogram-weighted BLUT construction method described in previously mentioned PCT Patent Application No. PCT/US2019/031620, performing BLUT modification (denoted as "(b)") to modifying bright part(s) or sub-range(s) of the BLUT to alleviate or reduce the risk of banding artifact in the reconstructed HDR image generated from backward reshaping the forward reshaped SDR image.

The FLUT and the forward MMR coefficients as generated by the "Forward Reshaping" block of FIG. 2A are used (in the "(d) d3DMT update" sub-block) to update SDR codewords/samples in (the luma and/or chroma channels/planes of) a backward d3DMT generated (e.g., as an inverse, etc.) from the forward d3DMT. The modified BLUT (as generated in the "(b) BLUT modification" sub-block) is used in the "(c) color rectification" sub-block to modify HDR chroma codewords (e.g., values, samples, etc.) in the backward d3DMT to rectify colors, thereby improving the color appearance of the reconstructed HDR image. Backward reshaping MMR coefficients can be computed from the updated backward d3DMT and the letter box information.

A d3DMT may be received by an unconstrained MMR matrix construction in a backward reshaping stage. An unconstrained least-squares problem may be formulated to solve for MMR coefficients that are to be used to backward reshape chroma codewords (including any letterbox reshaped SDR chroma codewords if applicable) in a reshaped SDR image into reconstructed chroma codewords (including any letterbox reconstructed HDR chroma codewords if applicable) in a reconstructed HDR image.

From the d3DMT, two vectors can be constructed using the average HDR chroma values of the non-zero bins (or the non-empty bins) of the 3D histogram representing the d3DMT, as follows:

$$v_t^{C_0} = \begin{bmatrix} \Psi_{t,C_0,q_0}^{Q,EDR} \\ \Psi_{t,C_0,q_1}^{Q,EDR} \\ \vdots \\ \Psi_{t,C_0,q_{K_t-1}}^{Q,EDR} \end{bmatrix}, v_t^{C_1} = \begin{bmatrix} \Psi_{t,C_1,q_0}^{Q,EDR} \\ \Psi_{t,C_1,q_1}^{Q,EDR} \\ \vdots \\ \Psi_{t,C_1,q_{K_t-1}}^{Q,EDR} \end{bmatrix} \quad (7)$$

Further, a matrix can be constructed using the SDR pixel values of the non-zero bins as follows:

$$S_t^{bwd} = \begin{bmatrix} p_{t,q_0}^{bwd^T} \\ p_{t,q_1}^{bwd^T} \\ \vdots \\ p_{t,q_{K_t-1}}^{bwd^T} \end{bmatrix} \quad (8)$$

where $$p_{t,q_k}^{bwd^T}=[1 \; \Psi_{t,Y,q_k}^{Q,SDR} \; \Psi_{t,C_0,q_k}^{Q,SDR} \; \Psi_{t,C_1,q_k}^{Q,SDR} \; \Psi_{t,Y,q_k}^{Q,SDR}.\Psi_{t,C_0,q_k}^{Q,SDR} \; \Psi_{t,Y,q_k}^{Q,SDR}.\Psi_{t,C_1,q_k}^{Q,SDR} \ldots ] \quad (9)$$

which contains all supported MMR terms.

Let $$A_t^{bwd}=(S_t^{bwd})^T S_t^{bwd}, b_t^{C_0,bwd}=(S_t^{bwd})^T v_t^{C_0,bwd} \quad (10)$$

$$b_t^{C_1,bwd}=(S_t^{bwd})^T v_t^{C_1,bwd} \quad (11)$$

The unconstrained MMR coefficients may be obtained in a closed form by solving the unconstrained least-squares problem using the unconstrained MMR matrix, as follows:

$$x_t^{C_0,bwd}=(A_t^{bwd})^{-1}b_t^{C_0,bwd}, x_t^{C_1,bwd}=(A_t^{bwd})^{-1}b_t^{C_1,bwd}. \quad (12)$$

Backward reshaping mappings comprising (or specifying) the BLUT and the backward reshaping MMR coefficients may be outputted in the coded bitstream as a part of image metadata (e.g., "rpu", etc.) accompanying the reshaped SDR image.

Each in some or all trade-off options as illustrated in FIG. 1B may be individually selected or made to configure the video encoder for the purpose of achieve a specific adjustable trade-off between decoder-side quality of reconstructed HDR images and encoder-side computational costs (or efficiency). A first trade-off option may be made to enable/disable noise injection: enable/disable by keeping/removing the processing sub-block (a) in FIG. 2A. A second trade-off option may be made to enable/disable BLUT modification by keeping/removing the processing sub-block (b) in FIG. 2A. A third trade-off option may be made to enable/disable color rectification by keeping/removing the processing sub-block (c) in FIG. 2A. A number of trade-off options may be made with respect to d3DMT updating. For example, a fourth trade-off option may be made to enable/disable the processing sub-block (d) in FIG. 2A. A fifth trade-off option may be made to keep the data flow(s) (2) and the processing sub-block (d) in FIG. 2A. A sixth trade-off option may be made to keep the data flow (3) and the processing sub-block (d) in FIG. 2A.

A seventh trade-off option is illustrated in FIG. 2B. Under this option, the backward d3DMT used to generate the backward reshaping mappings is constructed from the reference HDR image and the forward reshaped SDR image provided in data flows indicated as (4) of FIG. 2B.

In summary, adjustable trade-off techniques as described herein may be used for generating backward reshaping mappings and supporting end-to-end video delivery between video codecs. A variety of trade-off options can be selected or made to configure a video encoder to achieve optimal decoder-side quality of reconstructed HDR images in compliance with encoder-side availability of computing resources.

The availability of encoder-side and/or decoder-side computing resources may be used to (e.g., dynamically, statically, adaptively, etc.) select or made specific adjustable trade-off options. Example computing resources as described herein may include but are not limited to CPU consumptions, DSP processing capabilities, memory sizes, caches, data stores, network resources, latencies, delays in the end-to-end video delivery pipeline, etc.

Figure 2C:
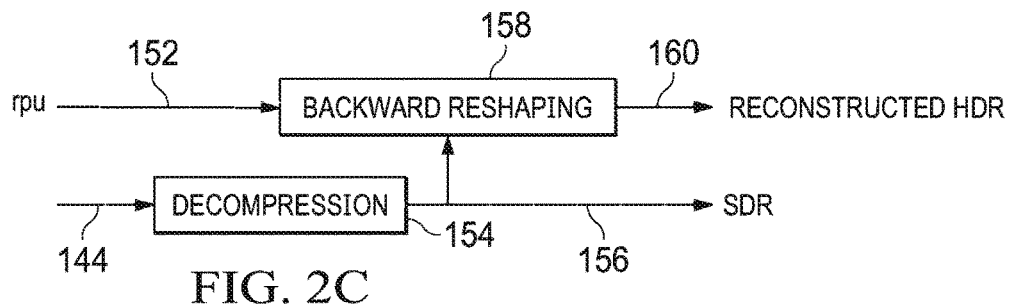

FIG. 2C illustrates an example video codecs such as a video decoder (e.g., the decoding block (130) of FIG. 1A, etc.), which may also be implemented with one or more computing processors in a downstream video decoder (e.g., a receiver, etc.), etc.

In some operational scenarios such as illustrated in FIG. 2C, a video signal encoded with (forward) reshaped SDR images in a single layer 144 and image metadata 152—which includes but is not necessarily limited to only the backward reshaping mappings generated by an upstream video encoder—as input by the video decoder.

A decompression block 154 (e.g., a part of the decoding block (130) of FIG. 1A, etc.) decompresses/decodes compressed video data in the single layer (144) of the video signal into the decoded SDR images (182). The decoded SDR images (182) may be the same as the reshaped SDR images, subject to quantization errors in the coding block (120) and in the decompression block (154), which may have been optimized for SDR display devices. The decoded SDR images (182) may be outputted in an output SDR video signal 156 (e.g., over an HDMI interface, over a video link, etc.) to and rendered on an SDR display device.

In addition, a backward reshaping block 158 extracts the backward reshaping mappings from the input video signal, constructs optimal backward reshaping functions based on the extracted backward reshaping mappings in the image metadata (152), and performs backward reshaping operations on the reshaped SDR images based on the optimal backward reshaping functions to generate reconstructed HDR images (e.g., backward reshaped HDR images, 132-1 of FIG. 1A, approximating HDR reference images, etc.).

In some embodiments, the backward reshaped HDR images represent production-quality or near-production-quality HDR images that are optimized for an HDR target/reference display device. The backward reshaped HDR images may be outputted in an output HDR video signal 160 (e.g., over an HDMI interface, over a video link, etc.) to and rendered on the HDR display device. In some operations, DM may not be implemented in a receiver to reduce costs or latencies.

Additionally, optionally or alternatively, in some operational scenarios, DM metadata may be transmitted in the image metadata (152) and the reshaped SDR images to the receiver. Display management operations specific to the HDR display device may be performed on the backward reshaped HDR images based at least in part on the DM metadata in the image metadata (152), for example to generate HDR display images to be rendered on the HDR display device.

For the purpose of illustration, single layer codec architectures have been described. It should be noted that techniques as described herein can be used in different single-layer codec architectures other than those illustrated in FIG. 2A through FIG. 2C. Additionally, optionally or alternatively, these techniques can be used in multi-layer codec architectures. Thus, these and other variations of single-layer or multi-layer codec architectures may operate with some or all of the techniques as described herein.

Updating d3DMT for Backward Reshaping

Much of the relatively large gap between the high fidelity and high-efficiency approaches as described in previously mentioned PCT Patent Application No. PCT/US2019/031620 in terms of decoder-side quality of reconstructed HDR images and encoder-side computational costs (or efficiency) can be attributed to methods used to compute or generate backward reshaping mappings (or functions) such as backward reshaping MMR coefficients for backward reshaping SDR images in chroma channels/planes.

On one hand, the high-efficiency approach computes the backward reshaping MMR coefficients directly from a forward d3DMT, thereby introducing errors significantly affecting the decoder-side quality of reconstructed HDR images. This is because the forward d3DMT may be sufficiently accurate for forward reshaping but may not be sufficiently accurate for backward reshaping.

Being performed in a single (luma) channel/plane of a color space, luma reshaping may be prone to yield errors in reshaped codewords/values to some extent. MMR prediction for chroma reshaping may generate further errors.

Figure 3A:
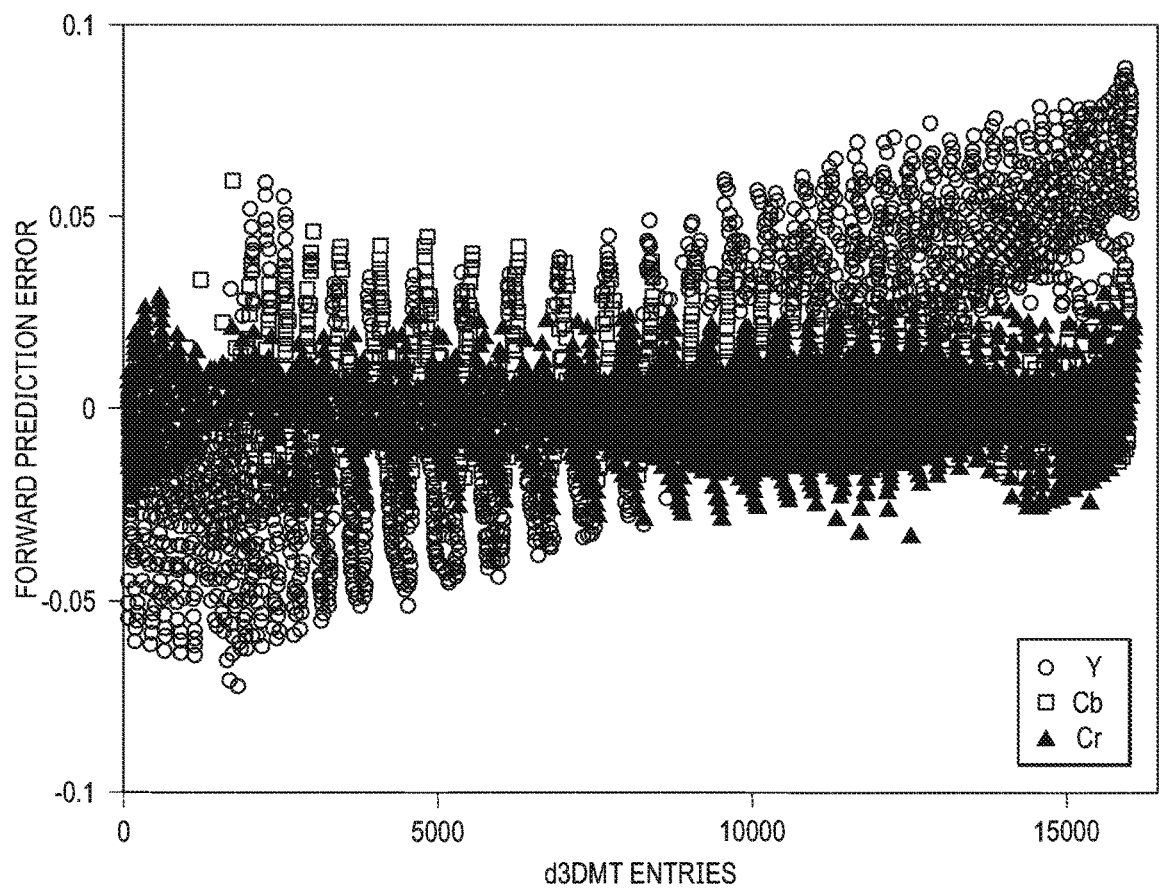
FIG. 3A illustrates example prediction errors.

FIG. 3A illustrates example prediction errors of Y, Cb (denoted as C0 or $C_0$) and Cr (denoted as C1 or $C_1$) caused by forward reshaping for each entry in a forward d3DMT. These prediction errors represent differences or deviations between original codewords/values in the forward d3DMT and the FLUT/MMR predicted codeword/values. Luma prediction errors may be more prominent than chroma prediction errors. These prediction errors may further propagate to backward reshaping, thereby yielding relatively significant errors in the reconstructed HDR images.

On the other hand, the high-fidelity approach constructs a new backward d3DMT from a reference (or source) HDR and a corresponding SDR image (e.g., forward reshaped SDR image, etc.), thereby incurring significant computational costs and latency.

The FLUT used for predicting SDR codewords/values in the luma channel/plane and the forward MMR coefficients used for predicting SDR codewords/values in the chroma channels/planes are first solved/obtained. To correct or minimize prediction errors introduced by forward reshaping in backward reshaping mappings, a backward d3DMT corresponding to a forward d3DMT may then be generated by replacing or correcting content-mapped SDR codewords/values (which were generated by content mapping HDR codewords/values/samples in the "Mapping Information" block of FIG. 2A or FIG. 2B) in SDR entries of the forward d3DMT with FLUT predicted luma SDR codewords/values and forward MMR predicted chroma codewords/values.

Denote mapping pairs in the forward d3DMT generated from HDR samples (or source HDR values in Y, $C_0$ and $C_1$ channels/planes) of the t-th HDR reference image (or frame) and corresponding SDR samples (or content mapped SDR values) generated by content mapping the HDR samples, as follows:

$$\begin{bmatrix} v_{t,0}^Y & v_{t,0}^{C_0} & v_{t,0}^{C_1} \\ v_{t,1}^Y & v_{t,1}^{C_0} & v_{t,1}^{C_1} \\ \vdots & & \\ v_{t,K-1}^Y & v_{t,K-1}^{C_0} & v_{t,K-1}^{C_1} \end{bmatrix} \rightarrow \begin{bmatrix} s_{t,0}^Y & s_{t,0}^{C_0} & s_{t,0}^{C_1} \\ s_{t,1}^Y & s_{t,1}^{C_0} & s_{t,1}^{C_1} \\ \vdots & & \\ s_{t,K-1}^Y & s_{t,K-1}^{C_0} & s_{t,K-1}^{C_1} \end{bmatrix} \quad (13)$$

where K is the total number of entries or rows in the forward d3DMT: $v_{t,k}^Y$, $v_{t,k}^{C_0}$ and $v_{t,k}^{C_1}$ denote the source HDR values in the Y, $C_0$ and $C_1$ channels/planes, respectively, of the k-th entry in the mapping table; $S_{t,k}^Y$, $S_{t,k}^{C_0}$ and $S_{t,k}^{C_1}$ denote the content mapped SDR values in Y, $C_0$ and $C_1$ channels/planes, respectively, of the k-th entry in the forward d3DMT; k is an integer between 0 and (K−1).

A mapping pair in a mapping table as described herein refers to a pair of an entry (e.g., on the left-hand side of expression (1) above, etc.) of HDR values $v_{t,k}^Y$, $v_{t,k}^{C_0}$ and $v_{t,k}^{C_1}$ and a corresponding entry (e.g., on the right-hand side of expression (1) above, etc.) of SDR values $S_{t,k}^Y$, $S_{t,k}^{C_0}$ and $S_{t,k}^{C_1}$. Under techniques as described herein, these values in the mapping pair may be updated for the purpose of generating relatively high quality backward reshaping mappings.

Let $FLUT_t(\cdot)$ denote a forward FLUT (generated from the forward d3DMT) used for predicting SDR codewords/values from HDR codewords/values in the luma channel/plane. Let $x_t^{C_0,fwd}$ and $x_t^{C_1,fwd}$ denote forward MMR coefficients (generated from the forward d3DMT) used for predicting SDR codewords/values from HDR codewords/values in the chroma channels/planes $C_0$ and $C_1$, respectively, as follows:

$$x_t^{C_0,fwd} = \begin{bmatrix} x_{t,0}^{C_0,fwd} \\ \vdots \\ x_{t,M-1}^{C_0,fwd} \end{bmatrix} \tag{14}$$

$$x_t^{C_1,fwd} = \begin{bmatrix} x_{t,0}^{C_{01},fwd} \\ \vdots \\ x_{t,M-1}^{C_1,fwd} \end{bmatrix}$$

where M represents the total number of terms in the MMR based forward reshaping mappings.

A backward d3DMT, which comprises mapping pairs from SDR to HDR, can be initially generated as an inverse to the forward d3DMT. For example, for the purpose of constructing the backward d3DMT initially as an inverse to the forward d3DMT, an HDR value that is mapped to an SDR value in the forward d3DMT may be used as a corresponding HDR value to which the SDR value is mapped in the backward d3DMT.

An example procedure of replacing, in the luma channel/plane, the content mapped SDR codewords/values with forward reshaped SDR codewords/values predicted with the FLUT in the backward d3DMT is illustrated in TABLE 4 below.

TABLE 4 for ( i = 0 ; i < K ; i ++ ){
    $\hat{s}_{t,i}^Y$ = FLUT$_t$ ($v_{t,i}^Y$);
}

In some operational scenarios, after updating the SDR luma codewords/values in the backward d3DMT initially generated as the inverse to the forward d3DMT, a modified backward d3DMT from HDR to SDR can be generated as follows:

$$\begin{bmatrix} v_{t,0}^Y & v_{t,0}^{C_0} & v_{t,0}^{C_1} \\ v_{t,1}^Y & v_{t,1}^{C_0} & v_{t,1}^{C_1} \\ & \vdots & \\ v_{t,K-1}^Y & v_{t,K-1}^{C_0} & v_{t,K-1}^{C_1} \end{bmatrix} \leftarrow \begin{bmatrix} \hat{s}_{t,0}^Y & s_{t,0}^{C_0} & s_{t,0}^{C_1} \\ \hat{s}_{t,1}^Y & s_{t,1}^{C_0} & s_{t,1}^{C_1} \\ & \vdots & \\ \hat{s}_{t,K-1}^Y & s_{t,K-1}^{C_0} & s_{t,K-1}^{C_1} \end{bmatrix} \tag{15}$$

As previously mentioned, to construct this backward d3DMT, an HDR value that is mapped to an SDR value in the forward d3DMT may be used as a corresponding HDR value to which the SDR value is mapped in the backward d3DMT.

An example procedure of replacing, in the chroma channels/planes, the content mapped SDR codewords/values with forward reshaped SDR codewords/values predicted with the forward MMR coefficients in the backward d3DMT is illustrated in TABLE 5 below.

TABLE 5 for ( i = 0 ; i < K ; i ++ ){
  $\hat{s}_{t,i}^{C_0} = x_{t,0}^{C_0,fwd} + x_{t,1}^{C_0,fwd} \cdot v_{t,i}^Y + x_{t,2}^{C_0,fwd} \cdot v_{t,i}^{C_0} + x_{t,3}^{C_0,fwd} \cdot v_{t,i}^{C_1} + \ldots + x_{t,M-1}^{C_0,fwd} \cdot (v_{t,i}^Y \cdot v_{t,i}^{C_0} \cdot v_{t,i}^{C_1})^3;$
  $\hat{s}_{t,i}^{C_1} = x_{t,0}^{C_1,fwd} + x_{t,1}^{C_1,fwd} \cdot v_{t,i}^Y + x_{t,2}^{C_1,fwd} \cdot v_{t,i}^{C_0} + x_{t,3}^{C_1,fwd} \cdot v_{t,i}^{C_1} + \ldots + x_{t,M-1}^{C_1,fwd} \cdot (v_{t,i}^Y \cdot v_{t,i}^{C_0} \cdot v_{t,i}^{C_1})^3;$
}

In some operational scenarios, after updating the SDR chroma codewords/values in the backward d3DMT initially generated as the inverse to the forward d3DMT, a modified backward d3DMT from SDR to HDR can be generated as follows:

$$\begin{bmatrix} v_{t,0}^Y & v_{t,0}^{C_0} & v_{t,0}^{C_1} \\ v_{t,1}^Y & v_{t,1}^{C_0} & v_{t,1}^{C_1} \\ & \vdots & \\ v_{t,K-1}^Y & v_{t,K-1}^{C_0} & v_{t,K-1}^{C_1} \end{bmatrix} \leftarrow \begin{bmatrix} s_{t,0}^Y & \hat{s}_{t,0}^{C_0} & \hat{s}_{t,0}^{C_1} \\ s_{t,1}^Y & \hat{s}_{t,1}^{C_0} & \hat{s}_{t,1}^{C_1} \\ & \vdots & \\ s_{t,K-1}^Y & \hat{s}_{t,K-1}^{C_0} & \hat{s}_{t,K-1}^{C_1} \end{bmatrix} \tag{16}$$

Additionally, optionally or alternatively, after updating the SDR luma and chroma codewords/values in the backward d3DMT, a modified backward d3DMT from SDR to HDR can be generated as follows:

$$\begin{bmatrix} v_{t,0}^Y & v_{t,0}^{C_0} & v_{t,0}^{C_1} \\ v_{t,1}^Y & v_{t,1}^{C_0} & v_{t,1}^{C_1} \\ & \vdots & \\ v_{t,K-1}^Y & v_{t,K-1}^{C_0} & v_{t,K-1}^{C_1} \end{bmatrix} \leftarrow \begin{bmatrix} \hat{s}_{t,0}^Y & \hat{s}_{t,0}^{C_0} & \hat{s}_{t,0}^{C_1} \\ \hat{s}_{t,1}^Y & \hat{s}_{t,1}^{C_0} & \hat{s}_{t,1}^{C_1} \\ & \vdots & \\ \hat{s}_{t,K-1}^Y & \hat{s}_{t,K-1}^{C_0} & \hat{s}_{t,K-1}^{C_1} \end{bmatrix} \tag{17}$$

Backward MMR coefficients used for predicting reconstructed HDR codewords/values may be computed from a modified backward d3DMT as represented in expressions (3) through (5). Take the updated backward d3DMT in expression (5) as an example. Construct a matrix as:

$$S_t = \begin{bmatrix} p_{t,0}^T \\ p_{t,1}^T \\ \vdots \\ p_{t,K-1}^T \end{bmatrix} \tag{18}$$

where $p_{t,k}^T = [1 \; \hat{s}_{t,1}^Y \; \hat{s}_{t,1}^{C_0} \; \hat{s}_{t,1}^{C_1} \; \hat{s}_{t,1}^Y \cdot \hat{s}_{t,1}^{C_0} \; \hat{s}_{t,1}^Y \cdot \hat{s}_{t,1}^{C_1} \; \ldots ]$ contains all (M) terms supported by MMR prediction operations.

Let $$v_t^{C_0} = \begin{bmatrix} v_{t,0}^{C_0 T} \\ v_{t,1}^{C_0 T} \\ \vdots \\ v_{t,K-1}^{C_0 T} \end{bmatrix} \tag{19-1}$$

$$v_t^{C_1} = \begin{bmatrix} v_{t,0}^{C_1 T} \\ v_{t,1}^{C_1 T} \\ \vdots \\ v_{t,K-1}^{C_1 T} \end{bmatrix} \tag{19-2}$$

$$A_t = S_t^T S_t \tag{19-3}$$

$$b_t^{C_0} = S_t^T v_t^{C_0} \tag{19-4}$$

$$b_t^{C_1} = S_t^T v_t^{C_1} \tag{19-5}$$

The backward MMR coefficients for backward reshaping can be computed as follows:

$$x_t^{C_0}(S_t^T S_t)^{-1}(S_t^T v_t^{C_0}) = (A_t)^{-1} b_t^{C_0} \tag{20-1}$$

$$x_t^{C_0}(S_t^T S_t)^{-1}(S_t^T v_t^{C_1}) = (A_t)^{-1} b_t^{C_1} \tag{20-2}$$

In some operational scenarios, prediction errors in backward reshaping in luma channel/plane are more significant than prediction errors in backward reshaping chroma channels/planes. In addition, generating and updating SDR luma codewords or values in updating/modifying the backward d3DMT is computationally more efficient than generating and updating SDR chroma codewords or values. In these operational scenarios, processing as indicated in TABLE 4 may be given higher priority than processing as indicated in TABLE 5.

FIG. 4A illustrates an example process flow for adjustable trade-offs between decoder-side quality of reconstructed HDR images and encoder-side computational costs of updating or building d3DMT for generating backward reshaping mappings. In some embodiments, a video encoder implemented with one or more computing devices may perform this process flow.

Block 402 comprises determining whether computing resources (e.g., of a video encoder, of a coding block, of one or more video codecs involved in delivering video data to a decoder/playback device, etc.) are available for supporting updating/building a forward d3DMT (or updating/building a corresponding backward d3DMT initially generated as an inverse thereof).

Block 404 comprises, in response to determining that the computing resources are not available for supporting updating/building the forward d3DMT (or the backward d3DMT), avoiding making changes to the forward d3DMT, directly using the inverse of the forward d3DMT as the backward d3DMT to compute backward MMR coefficients. A first color grade of reconstructed HDR images can be generated by a video decoder receiving forward reshaped SDR images and corresponding backward reshaping mappings generated at least in part by the backward MMR coefficients.

Figure 3B:
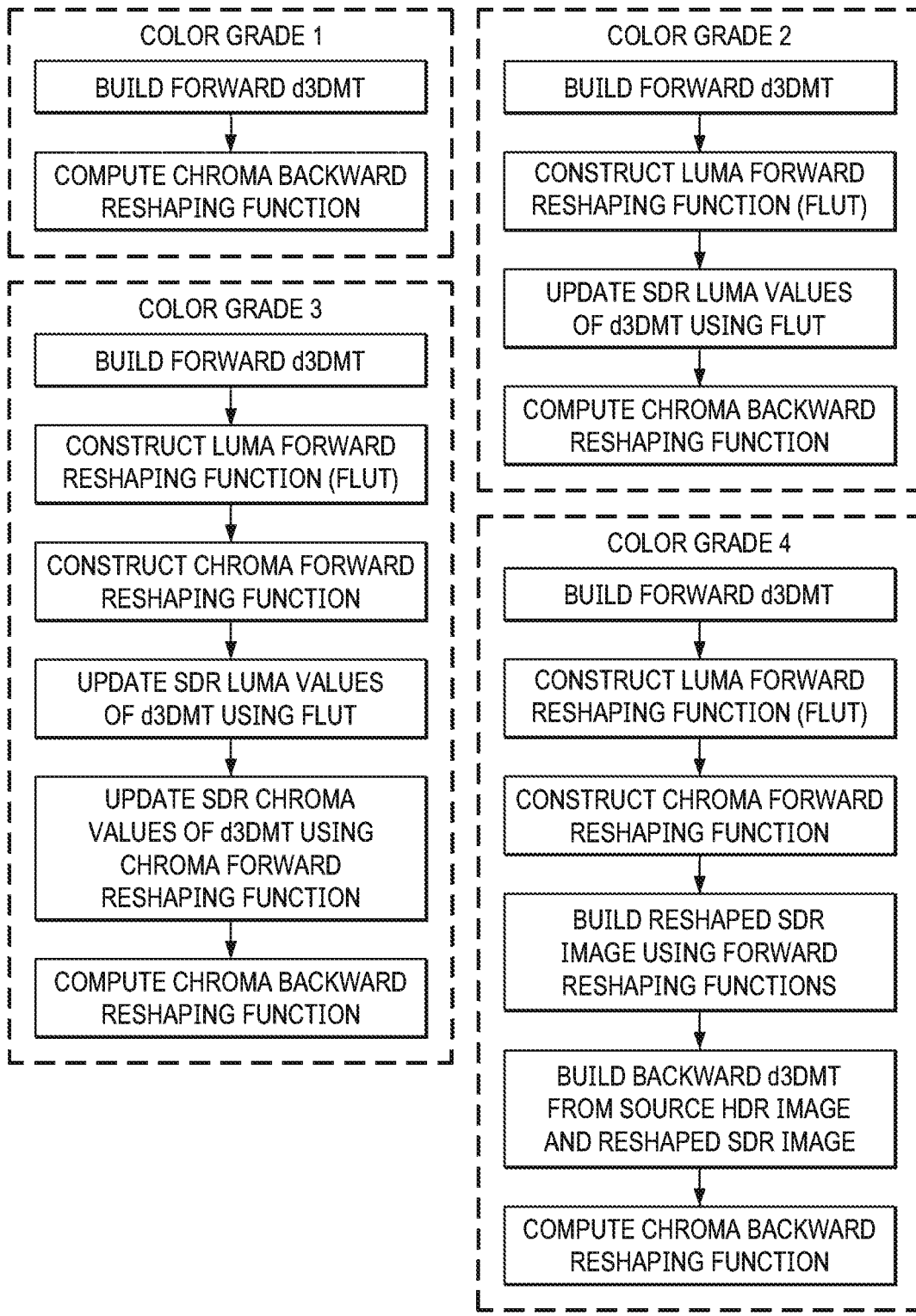
FIG. 3B illustrates example sets of image processing operations to generate different color grades.

To generate the first color grade, as illustrated in FIG. 3B, the video encoder first builds the forward d3DMT from HDR samples of each source (or input) HDR image and corresponding SDR samples of a content-mapped SDR image corresponding to the source HDR image. The video encoder then computes backward reshaping mappings including but not limited to a chroma backward reshaping function represented by backward reshaping MMR coefficients derived from a backward d3DMT as an inverse of the forward d3DMT (without any further update to the forward or backward d3DMT).

As used herein, different color grades may be generated to depict the same visual semantic content. A color grade may refer to a specific (e.g., encoder-generated, etc.) version of reconstructed HDR images depicting the same visual semantic content.

Block 406 comprises, in response to determining that the computing resources are available for supporting updating/building the forward d3DMT (or the backward d3DMT), determining a specific level of the available computing resources.

In some operational scenarios, a plurality of computing resource level thresholds may be configured for the video encoder and may be used by the video encoder to compare with the specific level of the available computing resources.

Block 408 comprises determining, based on the specific level of the available computing resources and the plurality of computing resource level thresholds, a corresponding specific trade-off option, among a plurality of trade-off options, for updating/building the d3DMT.

For example, in response to determining the specific level of the available computing resources is above a first computing resource level threshold but below a second computing resource level threshold (higher than the first computing resource level threshold), the video encoder can update SDR luma codewords/values of the forward d3DMT (or the corresponding backward d3DMT) as illustrated in TABLE 4. A second color grade of reconstructed HDR images can be generated by a video decoder receiving forward reshaped SDR images and corresponding backward reshaping mappings generated at least in part by backward MMR coefficients derived from the updated d3DMT.

To generate the second color grade, as illustrated in FIG. 3B, the video encoder first builds the forward d3DMT from HDR samples of each source (or input) HDR image and corresponding SDR samples of a content-mapped SDR image corresponding to the source HDR image. The video encoder generates a luma forward reshaping function based on the forward d3DMT and uses the luma forward reshaping function to update luma codewords/values (but without updating chroma codewords/values) in the forward d3DMT or a backward d3DMT initially generated as an inverse from the forward d3DMT. The video encoder then computes backward reshaping mappings including but not limited to a chroma backward reshaping function represented by backward reshaping MMR coefficients derived from the updated backward d3DMT.

In response to determining the specific level of the available computing resources is above the second computing resource level threshold but below a third computing resource level threshold (higher than the second computing resource level threshold), the video encoder can update SDR luma and chroma codewords/values of the forward d3DMT (or the corresponding backward d3DMT) as illustrated in TABLEs 4 and 5. A third color grade of reconstructed HDR images can be generated by a video decoder receiving forward reshaped SDR images and corresponding backward reshaping mappings generated at least in part by backward MMR coefficients derived from the updated d3DMT.

To generate the third color grade, as illustrated in FIG. 3B, the video encoder first builds the forward d3DMT from HDR samples of each source (or input) HDR image and corresponding SDR samples of a content-mapped SDR image corresponding to the source HDR image. The video encoder generates a luma forward reshaping function based on the forward d3DMT as well as generates chroma forward reshaping function (e.g., forward reshaping MMR coefficients, etc.) based on the forward d3DMT. The video encoder uses the luma and chroma forward reshaping functions to update luma codewords/values as well as chroma codewords/values in the forward d3DMT or a backward d3DMT initially generated as an inverse from the forward d3DMT. The video encoder then computes backward reshaping mappings including but not limited to a chroma backward reshaping function represented by backward reshaping MMR coefficients derived from the updated backward d3DMT.

In response to determining the specific level of the available computing resources is above the third computing resource level threshold, the video encoder can use HDR source (or reference) images and corresponding forward reshaped SDR images to construct a (new) backward d3DMT (e.g., without using an inverse of the forward d3DMT, etc.) for backward reshaping and proceed to compute backward MMR coefficients based on the constructed backward d3DMT. A fourth color grade of reconstructed HDR images can be generated by a video decoder receiving forward reshaped SDR images and corresponding backward reshaping mappings generated at least in part by backward MMR coefficients derived from the constructed backward d3DMT.

To generate the fourth color grade, as illustrated in FIG. 3B, the video encoder first builds the forward d3DMT from HDR samples of each source (or input) HDR image and corresponding SDR samples of a content-mapped SDR image corresponding to the source HDR image. The video encoder generates a luma forward reshaping function based on the forward d3DMT as well as generates chroma forward reshaping function (e.g., forward reshaping MMR coefficients, etc.) based on the forward d3DMT. The video encoder uses the luma and chroma forward reshaping functions to generate forward reshaped SDR image. The video encoder then computes backward reshaping mappings including but not limited to a chroma backward reshaping function represented by backward reshaping MMR coefficients derived from a backward d3DMT directly built based on the source HDR image and the forward reshaped SDR image.

BLUT Modification

In some operational scenarios, an example trade-off option is BLUT modification as illustrated in FIG. 1B. A maximum luminance range that can be represented by available codewords of SDR bins without showing banding artifacts is estimated using BLKSTD. An actual luminance range (e.g., possibly showing banding artifacts, etc.) represented by the available codewords is computed from a BLUT. The (e.g., brightest, brightest below a ceiling luma codeword/value, etc.) BLUT portion above a specific luma codeword/value (e.g., denoted as $\tilde{Y}$, etc.) may be modified based on a ratio between the maximum luminance range and the actual luminance range. Additionally, optionally or alternatively, the dark (e.g., darkest, darkest above a floor luma codeword/value, etc.) BLUT portion may be changed as a part of noise injection operations. Example BLUT modification and noise injection are described in previously mentioned U.S. Provisional Patent Application No. 62/885,921.

Enabling BLUT modification in a video encoder as described herein can alleviate or reduce banding artifacts in the bright regions of reconstructed HDR images, thereby significantly improving visual quality of these reconstructed HDR images.

Color Rectification for BLUT Modification

In some operational scenarios, while BLUT modification can alleviate banding artifacts in the bright regions, it is observed that the color appearance of impacted pixels—e.g., which have their luma codewords/values changed by BLUT modification—may change. For example, when banding artifacts are removed from the sky around the sun in a reconstructed HDR image through BLUT modification, the color of the sky in the reconstructed HDR image may look more saturated than a reconstructed HDR image without BLUT modification.

Generally, decreasing a luma value of a pixel may make the color of the pixel to look more saturated, while increasing the luma value of the pixel may make the pixel look less saturated, when chroma values of the pixel stay the same.

It may not mean saturation actually changes, but rather the color appearance of the pixel as perceived visually by a viewer is different at different luma values for the same chroma values.

In some operational scenarios, corresponding chroma values of pixels—corresponding to luma values of the pixels changed by BLUT modification—may be modified such that color appearances of these pixels look relatively close to those in source (e.g., reference, input, etc.) HDR images. A ratio between the modified BLUT and the original BLUT (without being changed through BLUT modification) is used as a desaturation (or chroma scaling) function to tune the chroma values.

Let $BLUT^{orig}(\cdot)$ denote the original BLUT. Let $BLUT^{mod}(\cdot)$ denote the modified BLUT that suppresses banding artifacts. BLUT maps (e.g., normalized, un-normalized, etc.) SDR luma values to (e.g., normalized, un-normalized, etc.) HDR luma values.

For the purpose of illustration only, chroma values are represented in a color space including but not limited to YCbCr, ICtCp, IPTPQ, etc., in which chroma values in the normalized domain [0 1] are represented with an offset 0.5. Thus, a chroma value of 0.5 means neutral color (grayscale). To tune chroma values (or saturation/color appearance thereof), the offset may be removed from the chroma values.

An example procedure of replacing, in the chroma channels/planes, input (or reference) HDR chroma codewords/values with desaturated HDR codewords/values in the backward d3DMT is illustrated in TABLE 6 below. This causes the desaturated HDR codewords/values, instead of the input (or reference) HDR chroma codewords/values, to be approximated by reconstructed HDR codewords/values generated by backward reshaping mappings as described herein.

TABLE 6 for ( i = 0; i < K ; i++ ){
  if ($v_{t,i}^Y > \tilde{Y}$ ){
$$\hat{v}_{t,i}^{C_0} = \left(\frac{BLUT^{mod}(s_{t,i}^Y)}{BLUT^{orig}(s_{t,i}^Y)}\right)^\beta \cdot \left(v_{t,i}^{C_0} - 0.5\right) + 0.5;$$
$$\hat{v}_{t,i}^{C_1} = \left(\frac{BLUT^{mod}(s_{t,i}^Y)}{BLUT^{orig}(s_{t,i}^Y)}\right)^\beta \cdot \left(v_{t,i}^{C_1} - 0.5\right) + 0.5;$$
  }
}

In some operational scenarios, after updating the HDR chroma codewords/values (as well as replacing content mapped SDR codewords/values with forward reshaped SDR codewords/values) in the backward d3DMT initially generated as the inverse to the forward d3DMT, a modified backward d3DMT from HDR to SDR can be generated as follows:

$$\begin{bmatrix} \hat{s}_{t,0}^Y & \hat{s}_{t,0}^{C_0} & \hat{s}_{t,0}^{C_1} \\ \hat{s}_{t,1}^Y & \hat{s}_{t,1}^{C_0} & \hat{s}_{t,1}^{C_1} \\ \vdots \\ \hat{s}_{t,K-1}^Y & \hat{s}_{t,K-1}^{C_0} & \hat{s}_{t,K-1}^{C_1} \end{bmatrix} \rightarrow \begin{bmatrix} v_{t,0}^Y & \hat{v}_{t,0}^{C_0} & \hat{v}_{t,0}^{C_1} \\ v_{t,1}^Y & \hat{v}_{t,1}^{C_0} & \hat{v}_{t,1}^{C_1} \\ \vdots \\ v_{t,K-1}^Y & \hat{v}_{t,K-1}^{C_0} & \hat{v}_{t,K-1}^{C_1} \end{bmatrix} \quad (21)$$

Backward MMR coefficients in the backward reshaping mappings can then be computed from the backward d3DMT.

The parameter $\beta$ in the desaturation function $$\left(\frac{BLUT^{mod}(s_{t,i}^Y)}{BLUT^{orig}(s_{t,i}^Y)}\right)^\beta$$

as shown in TABLE 6 represents a tuning parameter whose actual value may be determined or tuned through empirical studies of color appearances of original (e.g., training, etc.) HDR images and corresponding reconstructed HDR images with desaturated chroma values and without desaturated chroma values. Example values for the parameter $\beta$ may include, but are not necessarily limited to only, one of 1.5, 2, 2.5, 3, 3.5, etc.

As illustrated in TABLE 6, a desaturated chroma value $\hat{v}_{t,i}^{C_0}$ in the $C_0$ or Cb channel comprises two terms. The first term $$\left(\frac{BLUT^{mod}(s_{t,i}^Y)}{BLUT^{orig}(s_{t,i}^Y)}\right)^\beta \left(v_{t,i}^{C_0} - 0.5\right)$$

represents a deviation of the desaturated chroma value from the neutral gray value 0.5. Thus, when the first term of the desaturated chroma value $\hat{v}_{t,i}^{C_0}$ in the $C_0$ or Cb channel is relatively small, the desaturated chroma value $\hat{v}_{t,i}^{C_0}$ is tuned relatively close to the neutral gray value 0.5. As a result, the color of a pixel having this desaturated chroma value $\hat{v}_{t,i}^{C_0}$, as tuned relatively close to the neutral gray value 0.5, is more desaturated than the pixel with the corresponding pre-tuned chroma value $\hat{v}_{t,i}^{C_0}$.

Similarly, a desaturated chroma value $\hat{v}_{t,i}^{C_1}$ in the $C_1$ or Cr channel comprises two terms. The first term $$\left(\frac{BLUT^{mod}(s_{t,i}^Y)}{BLUT^{orig}(s_{t,i}^Y)}\right)^\beta \left(v_{t,i}^{C_1} - 0.5\right)$$

represents a deviation of the desaturated chroma value from the neutral gray value 0.5. Thus, when the first term of the desaturated chroma value $\hat{v}_{t,i}^{C_1}$ in the $C_1$ or Cb channel is relatively small, the desaturated chroma value $\hat{v}_{t,i}^{C_1}$ is tuned relatively close to the neutral gray value 0.5. As a result, the color of a pixel having this desaturated chroma value $\hat{v}_{t,i}^{C_1}$, as tuned relatively close to the neutral gray value 0.5, is more desaturated than the pixel with the corresponding pre-tuned chroma value $\hat{v}_{t,i}^{C_1}$.

Figure 3C:
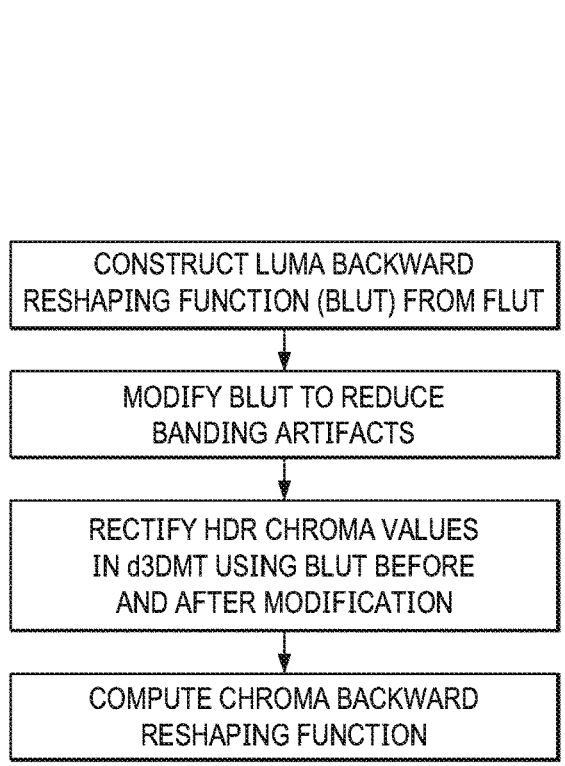
FIG. 3C illustrates example color rectification applicable to different color grades.

FIG. 3C illustrates example color rectification applicable to any color grade in a variety of color grades (e.g., color grades 2-4 as illustrated in FIG. 3B, etc.). By way of example, a video encoder generates a luma backward reshaping function such as a (e.g., pre-modified, etc.) BLUT based on a backward d3DMT as described herein. The video encoder then modifies the BLUT to reduce (e.g., a risk of, etc.) banding artifacts. The video encoder uses the pre-modified BLUT and the modified BLUT to generate a desaturation function (e.g., as a ratio illustrated in TABLE 6 above, etc.) to update HDR chroma codewords/values in the backward d3DMT. The video encoder then computes backward reshaping mappings including but not limited to a chroma backward reshaping function represented by backward reshaping MMR coefficients derived from the updated backward d3DMT.

Figure 3D:
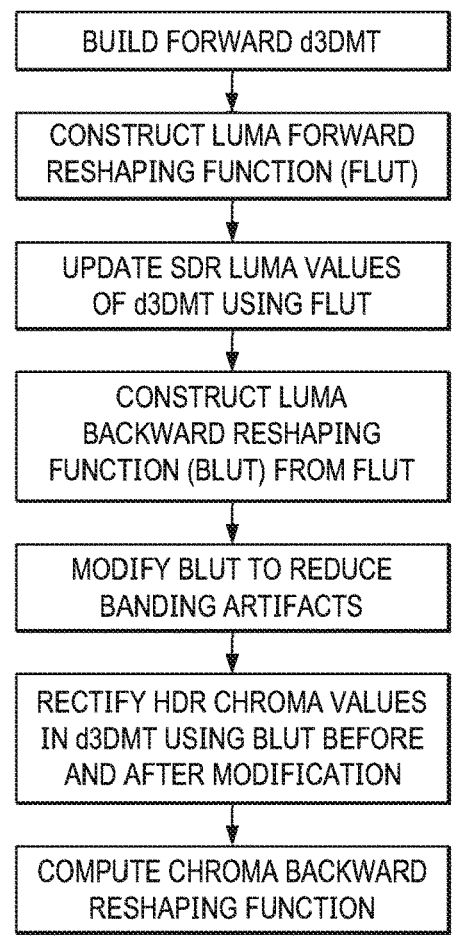
FIG. 3D illustrates example color rectification performed in conjunction with mapping table update operations.

FIG. 3D illustrates example color rectification performed in conjunction with d3DMT update operations for color grade 2 (as illustrated in FIG. 3B). A video encoder first builds the forward d3DMT from HDR samples of each source (or input) HDR image and corresponding SDR samples of a content-mapped SDR image corresponding to the source HDR image. The video encoder constructs or generates a luma forward reshaping function based on the forward d3DMT. The video encoder uses the luma forward reshaping function to update luma codewords/values in the forward d3DMT or a backward d3DMT initially generated as an inverse from the forward d3DMT. The video encoder then constructs or generates a luma backward reshaping function based on the backward d3DMT. The video encoder further modifies the BLUT to reduce banding artifacts. The video encoder uses the pre-modified BLUT and the modified BLUT to generate a desaturation function (e.g., as a ratio illustrated in TABLE 6 above, etc.) to update HDR chroma codewords/values in the backward d3DMT. The video encoder subsequently computes backward reshaping mappings including but not limited to a chroma backward reshaping function represented by backward reshaping MMR coefficients derived from the updated backward d3DMT.

Backward Reshaping Mappings and Temporal Stability

Figure 3E:
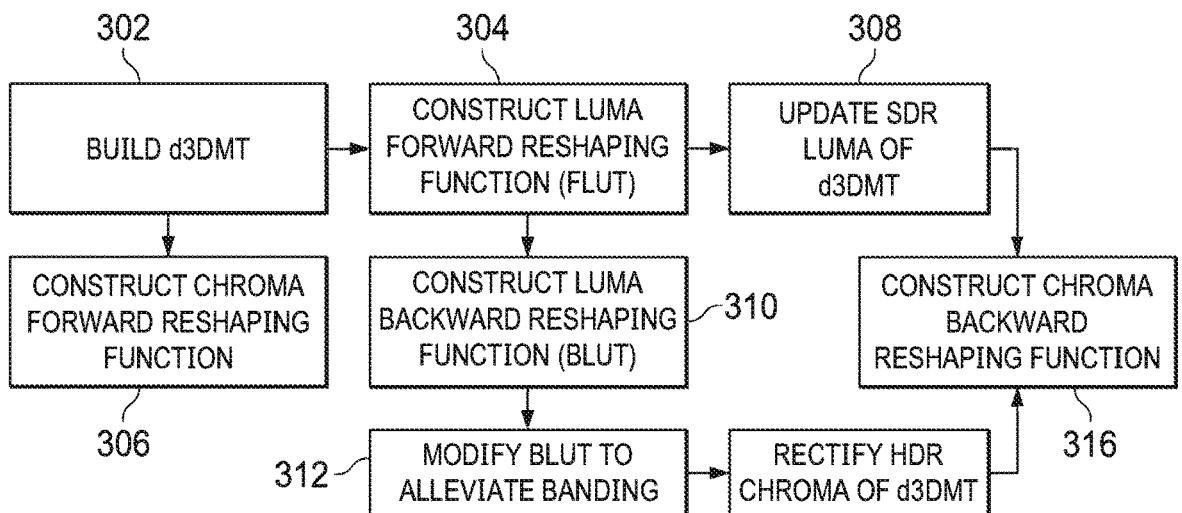
FIG. 3E illustrates example backward reshaping mapping generation with luma updating, backup lookup table modification and color rectification.

FIG. 3E illustrates example backward reshaping mapping generation with luma updating, BLUT modification and color rectification. Block 302 comprises using sampled HDR codewords of source HDR images and corresponding content-mapped SDR codewords to construct d3DMTs, each of which comprises a plurality of mapping pairs between HDR codewords and SDR codewords for a given source HDD image. Block 304 comprises constructing, based on the plurality of mapping pairs in each d3DMT, a corresponding luminance forward reshaping function such as a forward lookup table (FLUT). Block 306 comprises constructing, based on the plurality of mapping pairs in each d3DMT, corresponding forward chroma mappings represented by forward MMR coefficients. Block 308 comprises updating SDR luma codewords in the plurality of mapping pairs in each d3DMT by replacing the content-mapped SDR luma codewords with forward reshaped SDR codewords predicted with the FLUT. Block 310 comprises constructing a luma backward reshaping function (BLUT) from the FLUT. Block 312 comprises modifying the BLUT to alleviate or reduce the risk of banding artifacts. Block 314 comprises rectifying HDR chroma codewords in the plurality of mapping pairs in each d3DMT by replacing sampled HDR chroma codewords with desaturated HDR chroma codewords generated based on the original and modified BLUTs. Block 316 comprises computing—based on the updated d3DMT comprising the plurality of mapping pairs with updated luminance SDR codewords and updated chrominance HDR codewords—chroma backward reshaping mappings (e.g., a chroma backward reshaping function, backward (reshaping) MMR coefficients, etc.) for each forward reshaped SDR image corresponding to one of the source HDR images.

In some operational scenarios, linear segment-based structures may be used in computing/generating/including backward reshaping mappings in image metadata for the purpose of maintaining temporal stability of the image metadata. Example linear segment-based structures are described in U.S. Patent Application No. 2018/0007356, published on Jan. 4, 2018, the entire contents of which are hereby incorporated by reference as if fully set forth herein.

Some or all techniques as described herein can be implemented and/or performed as parts of real time operation to produce suitable color grades of video content for broadcast video applications, real time streaming applications, etc. Additionally, optionally or alternatively, some or all techniques as described herein can be implemented and/or performed as parts of time-delay or offline operation to produce suitable color grades of video content for non-real time streaming applications, cinema applications, etc.

Example Process Flows

FIG. 4B illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 422, an image processing system generates a backward reshaping mapping table initially as an inverse of a forward reshaping table.

The forward reshaping table is used to generate forward reshaping mappings to generate a forward reshaped image of a first dynamic range from a source image of a second dynamic range. The first dynamic range is lower than the second dynamic range. The forward reshaping mapping table comprises sampled luminance codewords of the second dynamic range, sampled chrominance codewords of the second dynamic range, content-mapped luminance codewords of the first dynamic range corresponding to the sampled luminance codewords of the second dynamic range, and content-mapped chrominance codewords of the first dynamic range corresponding to the sampled chrominance codewords of the second dynamic range.

In block 424, the image processing system updates the backward reshaping mapping table by replacing the content-mapped luminance codewords with forward reshaped luminance codewords. The forward reshaped luminance codewords are generated by applying a luminance forward mapping to the sampled luminance codewords of the second dynamic range. The luminance forward mapping is constructed from the forward reshaping mapping table.

In block 426, the image processing system uses the backward reshaping mapping table and the luminance forward mapping to generate backward reshaping mappings for creating a reconstructed image of the second dynamic range from the forward reshaped image of the first dynamic range.

In block 428, the image processing system encodes, in a video signal, the forward reshaped image along with image metadata specifying the backward reshaping mappings. A recipient device of the video signal applies the backward reshaping mappings to the forward reshaped image to create the reconstructed image of the second dynamic range.

In an embodiment, the image processing system is further configured to perform: determining computational resources available in an end-to-end video delivery pipeline; using the available computational resources to determine a specific set of trade-off options between decoder-side quality of the reconstructed image of the second dynamic range and encoder-side computational complexity of generating the backward reshaping mappings; performing a specific set of image processing operations in accordance with the specific set of trade-off options to generate the backward reshaping mappings.

In an embodiment, the image processing system is further configured to cause a display image to be derived from the reconstructed image and rendered with the recipient device of the video signal.

In an embodiment, the image processing system is further configured to update the backward reshaping mapping table by replacing the content-mapped chrominance codewords with forward reshaped chrominance codewords. The forward reshaped chrominance codewords are generated by applying a multivariate multiple regression (MMR) chrominance forward mapping to the sampled luminance and chrominance codewords of the second dynamic range. The MMR chrominance forward mapping is constructed from the forward reshaping mapping table.

In an embodiment, the image processing system is further configured to update the backward reshaping mapping table by replacing the sampled chrominance codewords with desaturated chrominance codewords.

In an embodiment, the desaturated chrominance codewords are generated by applying a desaturation function to the sampled chrominance codewords; the desaturation function is constructed as a ratio between a modified luminance backward reshaping mapping and an original luminance backward reshaping mapping.

In an embodiment, the image processing system is further configured to cause a backward lookup table modification to be applied to reduce banding artifacts in the reconstructed images.

In an embodiment, at least one of the backward mapping table and the forward mapping table represents a three-dimensional mapping table (3DMT) dynamically constructed at least in part from the source image and the forward reshaped image.

In an embodiment, the luminance forward mapping is represented by a luminance lookup table.

In an embodiment, the reconstructed image of the second dynamic range approximates the source image of the second dynamic range.

In an embodiment, the video signal represents a single-layer backward compatible video signal.

FIG. 4C illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, a prediction model and feature selection system, a reverse mapping generation and application system, etc.) may perform this process flow. In block 442, a video decoding system decodes, from a video signal, a forward reshaped image of a first dynamic range.

In block 444, the video decoding system decodes, from the video signal, image metadata comprising backward reshaping mappings.

The backward reshaping mappings were generated by an upstream image processing device from a backward reshaping mapping table and a luminance forward mapping. The backward reshaping mapping table was initially generated by the upstream image processing device as an inverse of a forward reshaping mapping table that generates the luminance forward mapping. Content-mapped luminance codewords in the backward reshaping mapping table was updated with forward reshaped luminance codewords. The forward reshaped luminance codewords were generated by applying the luminance forward mapping to sampled source luminance codewords in the source image.

In block 446, the video decoding system applies the backward reshaping mappings to the forward reshaped image to generate the reconstructed image.

In block 448, the video decoding system causes a display image derived from the reconstructed image to be rendered with a display device.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
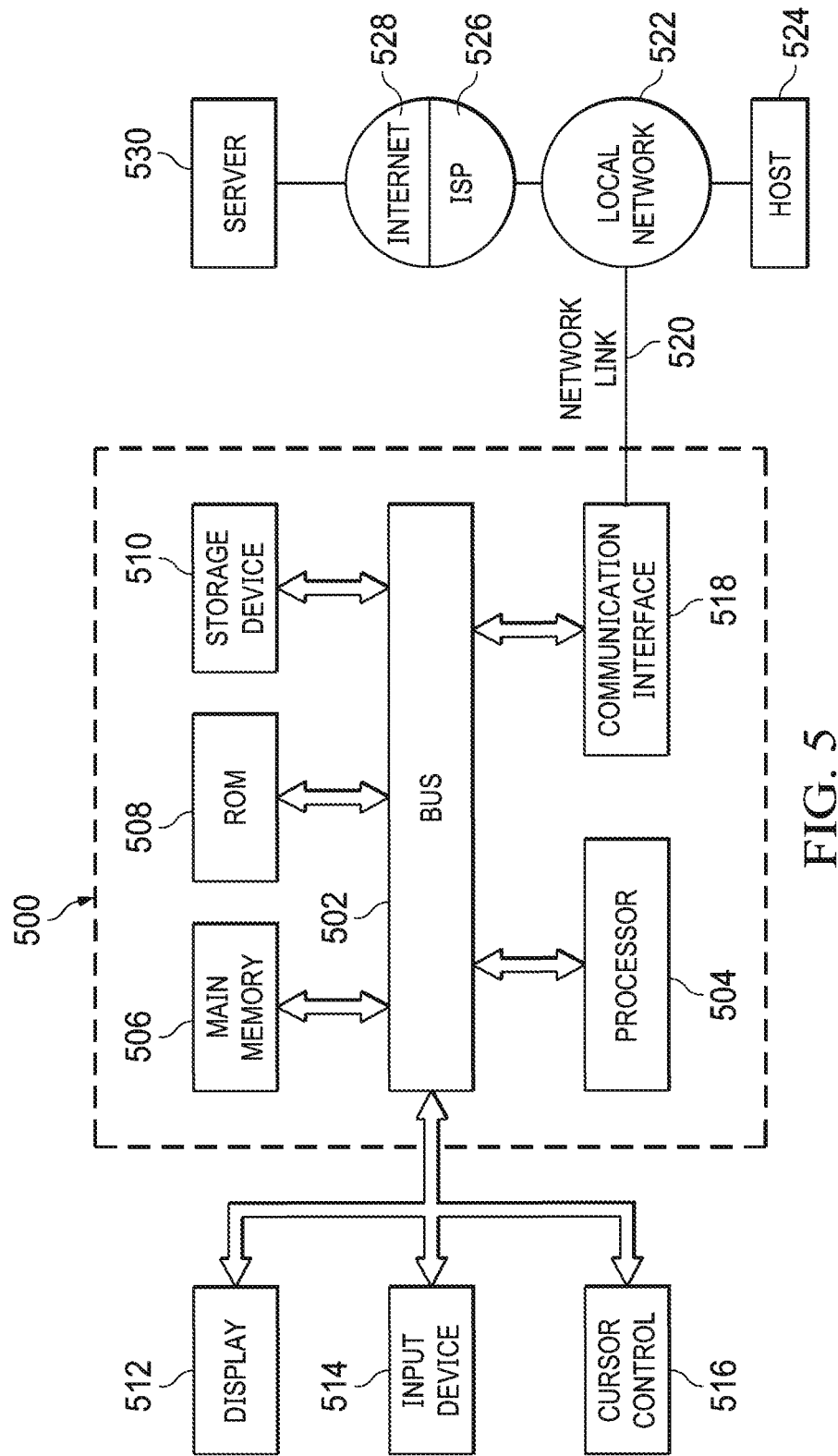
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method comprising:
generating a backward reshaping mapping table initially as an inverse of a forward reshaping mapping table, wherein the forward reshaping table is used to generate forward reshaping mappings to generate a forward reshaped image of a first dynamic range from a source image of a second dynamic range, wherein the first dynamic range is lower than the second dynamic range, wherein the forward reshaping mapping table comprises sampled luminance codewords of the second dynamic range, sampled chrominance codewords of the second dynamic range, content-mapped luminance codewords of the first dynamic range corresponding to the sampled luminance codewords of the second dynamic range, and content-mapped chrominance codewords of the first dynamic range corresponding to the sampled chrominance codewords of the second dynamic range;
updating the backward reshaping mapping table by replacing the content-mapped luminance codewords with forward reshaped luminance codewords, wherein the forward reshaped luminance codewords are generated by applying a luminance forward mapping to the sampled luminance codewords of the second dynamic range, wherein the luminance forward mapping is constructed from the forward reshaping mapping table;
using the backward reshaping mapping table and the luminance forward mapping to generate backward reshaping mappings for creating a reconstructed image of the second dynamic range from the forward reshaped image of the first dynamic range;
encoding, in a video signal, the forward reshaped image along with image metadata specifying the backward reshaping mappings.

EEE 2. The method of EEE 1, wherein a recipient device of the video signal applies the backward reshaping mappings to the forward reshaped image to create the reconstructed image of the second dynamic range.

EEE 3. The method of EEE 1 or 2, further comprising:
  determining computational resources available in an end-to-end video delivery pipeline;
  using the available computational resources to determine a specific set of trade-off options between decoder-side quality of the reconstructed image of the second dynamic range and encoder-side computational complexity of generating the backward reshaping mappings;
  performing a specific set of image processing operations in accordance with the specific set of trade-off options to generate the backward reshaping mappings.

EEE 4. The method of EEE 2 or 3, further comprising:
  causing a display image to be derived from the reconstructed image and rendered with the recipient device of the video signal.

EEE 5. The method of any of EEEs 1-4, further comprising:
  updating the backward reshaping mapping table by replacing the content-mapped chrominance codewords with forward reshaped chrominance codewords, wherein the forward reshaped chrominance codewords are generated by applying a multivariate multiple regression (MMR) chrominance forward mapping to the sampled luminance and chrominance codewords of the second dynamic range, wherein the MMR chrominance forward mapping is constructed from the forward reshaping mapping table.

EEE 6. The method of any of EEEs 1-5, further comprising:
  updating the backward reshaping mapping table by replacing the sampled chrominance codewords with desaturated chrominance codewords.

EEE 7. The method of EEE 6, wherein the desaturated chrominance codewords are generated by applying a desaturation function to the sampled chrominance codewords, and wherein the desaturation function is constructed as a ratio between a modified luminance backward reshaping mapping and an original luminance backward reshaping mapping.

EEE 8. The method of any of EEEs 1-7, further comprising:
  causing a backward lookup table modification to be applied to reduce banding artifacts in the reconstructed images.

EEE 9. The method of any of EEEs 1-8, wherein at least one of the backward mapping table and the forward mapping table represents a three-dimensional mapping table (3DMT) dynamically constructed at least in part from the source image and the forward reshaped image.

EEE 10. The method of any of EEEs 1-9, wherein the luminance forward mapping is represented by a luminance lookup table.

EEE 11. The method of any of EEEs 1-10, wherein the reconstructed image of the second dynamic range approximates the source image of the second dynamic range.

EEE 12. The method of any of EEEs 1-11, wherein the video signal represents a single-layer backward compatible video signal.

EEE 13. A method comprising:
  decoding, from a video signal, a forward reshaped image of a first dynamic range;
  decoding, from the video signal, image metadata comprising backward reshaping mappings;
  wherein the backward reshaping mappings were generated by an upstream image processing device from a backward reshaping mapping table and a luminance forward mapping;
  wherein the backward reshaping mapping table was initially generated by the upstream image processing device as an inverse of a forward reshaping mapping table that generates the luminance forward mapping;
  wherein content-mapped luminance codewords in the backward reshaping mapping table was updated with forward reshaped luminance codewords;
  wherein the forward reshaped luminance codewords were generated by applying the luminance forward mapping to sampled source luminance codewords in the source image;
  applying the backward reshaping mappings to the forward reshaped image to generate the reconstructed image;
  causing a display image derived from the reconstructed image to be rendered with a display device.

EEE 14. A computer system configured to perform any one of the methods recited in EEEs 1-13.

EEE 15. An apparatus comprising a processor and configured to perform any one of the methods recited in EEEs 1-13.

EEE 16. A non-transitory computer-readable storage medium having stored thereon computer-executable instruction for executing a method with one or more processors in accordance with any of the methods recited in EEEs 1-13.

The invention claimed is:

1. A method comprising:
generating a backward reshaping mapping table initially as an inverse of a forward reshaping mapping table, wherein the forward reshaping mapping table is used to generate forward reshaping mappings to generate a forward reshaped image of a first dynamic range from a source image of a second dynamic range, wherein the first dynamic range is lower than the second dynamic range, wherein the forward reshaping mapping table comprises luminance codewords of the second dynamic range and chrominance codewords of the second dynamic range of samples from the source image, and luminance codewords of the first dynamic range and chrominance codewords of the first dynamic range of corresponding samples from a reference image of the first dynamic range generated by color grading the source image, wherein the number of samples from the source image is reduced as compared to the number of pixels in the source image;
updating the backward reshaping mapping table by replacing in the backward reshaping mapping table the luminance codewords of the first dynamic range with forward reshaped luminance codewords, wherein the forward reshaped luminance codewords are generated by applying a luminance forward reshaping function to the luminance codewords of the second dynamic range, wherein the luminance forward reshaping function is constructed from the forward reshaping mapping table with cumulative density function (CDF) matching;
constructing from the luminance forward reshaping function a luminance backward reshaping function mapping luminance codewords of the first dynamic range to luminance codewords of the second dynamic range;
modifying a portion of the luminance backward reshaping function above a specific luminance codeword of the first dynamic range based on a ratio between an estimated maximum luminance range that can be represented without showing banding artifacts and an actual luminance range represented by the luminance backward reshaping function;

updating the backward reshaping mapping table by replacing in the backward reshaping mapping table the chrominance codewords of the second dynamic range with desaturated chrominance codewords, wherein the desaturated chrominance codewords are generated by applying a desaturation function to the chrominance codewords of the second dynamic range, wherein the desaturation function is constructed based on a ratio between the modified luminance backward reshaping function and the original luminance backward reshaping function;

using the backward reshaping mapping table and the luminance forward reshaping function to generate backward reshaping mappings for creating a reconstructed image of the second dynamic range from the forward reshaped image of the first dynamic range;

encoding, in a video signal, the forward reshaped image along with image metadata specifying the backward reshaping mappings.

2. The method of claim 1, further comprising:
determining computational resources available in an end-to-end video delivery pipeline;
using the available computational resources to determine a specific set of trade-off options between decoder-side quality of the reconstructed image of the second dynamic range and encoder-side computational complexity of generating the backward reshaping mappings;
performing a specific set of image processing operations in accordance with the specific set of trade-off options to generate the backward reshaping mappings.

3. The method of claim 1, further comprising: causing a display image to be derived from the reconstructed image and rendered with a recipient device of the video signal.

4. The method of claim 1, further comprising:
updating the backward reshaping mapping table by replacing in the backward reshaping mapping table the chrominance codewords of the first dynamic range with forward reshaped chrominance codewords, wherein the forward reshaped chrominance codewords are generated by applying a multivariate multiple regression (MMR) chrominance forward mapping to the luminance and chrominance codewords of the second dynamic range, wherein the MMR chrominance forward mapping is constructed from the forward reshaping mapping table.

5. The method of claim 1, further comprising:
causing a backward lookup table modification to be applied to reduce banding artifacts in the reconstructed images.

6. The method of claim 1, wherein at least one of the backward reshaping mapping table and the forward reshaping mapping table represents a three-dimensional mapping table (3DMT) dynamically constructed at least in part from the source image and the forward reshaped image.

7. The method of claim 1, wherein the luminance forward reshaping function is represented by a luminance lookup table.

8. The method of claim 1, wherein the reconstructed image of the second dynamic range approximates the source image of the second dynamic range.

9. The method of claim 1, wherein the video signal represents a single-layer backward compatible video signal.

10. The method of claim 1, wherein a recipient device of the video signal applies the backward reshaping mappings to the forward reshaped image to create the reconstructed image of the second dynamic range.

11. The method of claim 1 further comprising:
in a decoder, decoding from the video signal, a forward reshaped image of a first dynamic range, generated from a source image of a second dynamic range by forward reshaping mappings generated from a forward reshaping mapping table, wherein the forward reshaping mapping table comprises luminance codewords of the second dynamic range and chrominance codewords of the second dynamic range of samples from the source image, and luminance codewords of the first dynamic range and chrominance codewords of the first dynamic range of corresponding samples from a reference image of the first dynamic range generated by color grading the source image, wherein the number of samples from the source image is reduced as compared to the number of pixels in the source image;
decoding, from the video signal, image metadata comprising backward reshaping mappings;
applying the backward reshaping mappings to the forward reshaped image to generate a reconstructed image;
causing a display image derived from the reconstructed image to be rendered with a display device.

12. A computer system configured to perform the method recited in claim 1.

13. An apparatus comprising a processor and configured to perform the method recited in claim 1.

14. A non-transitory computer-readable storage medium having stored thereon computer-executable instruction for executing a method with one or more processors in accordance with the method recited in claim 1.

* * * * *